United States Patent
Marshall et al.

(10) Patent No.: US 9,527,671 B2
(45) Date of Patent: Dec. 27, 2016

(54) CONVEYOR BELT FOR PRODUCT STABILIZATION

(71) Applicant: Laitram, L.L.C., Harahan, LA (US)

(72) Inventors: Angela L. Marshall, Harahan, LA (US); Nicholas J. Judice, Hammond, LA (US); R. Scott Dailey, Destrehan, LA (US); John F. Landrum, New Orleans, LA (US); Jorge E. Nagel, New Orleans, LA (US); Gilbert J. MacLachlan, Harahan, LA (US); Glenn R. McCall, Jr., Harvey, LA (US); Dennis K. Scates, Kennesaw, GA (US)

(73) Assignee: Laitram, L.L.C., Harahan, LA (US)

( * ) Notice: Subject to any disclaimer, the term of this patent is extended or adjusted under 35 U.S.C. 154(b) by 0 days.

(21) Appl. No.: 14/412,390

(22) PCT Filed: Jul. 23, 2013

(86) PCT No.: PCT/US2013/051707
§ 371 (c)(1),
(2) Date: Dec. 31, 2014

(87) PCT Pub. No.: WO2014/018544
PCT Pub. Date: Jan. 30, 2014

(65) Prior Publication Data
US 2015/0183584 A1   Jul. 2, 2015

Related U.S. Application Data

(60) Provisional application No. 61/674,956, filed on Jul. 24, 2012.

(51) Int. Cl.
*B65G 17/06* (2006.01)
*B65G 17/08* (2006.01)
*B65G 17/46* (2006.01)

(52) U.S. Cl.
CPC ............. *B65G 17/06* (2013.01); *B65G 17/086* (2013.01); *B65G 17/46* (2013.01)

(58) Field of Classification Search
CPC ....... B65G 17/06; B65G 17/08; B65G 17/086; B65G 21/22; B65G 15/42
(Continued)

(56) References Cited

U.S. PATENT DOCUMENTS 3,706,200 A   12/1972   Mueller
3,731,789 A   5/1973   Fleischhauer
(Continued)

FOREIGN PATENT DOCUMENTS

| EP | 1647504 A1 | 4/2006 |
|---|---|---|
| WO | 03070608 A1 | 8/2003 |
| WO | 2012068699 A1 | 5/2012 |

OTHER PUBLICATIONS

Extended European Search Report, Application No. 13822514.9, mailed Mar. 29, 2016, European Patent Office, Munich, Germany.

*Primary Examiner* — James R Bidwell
(74) *Attorney, Agent, or Firm* — Catherine M. Bishop

(57) ABSTRACT

A platform member for a knuckle-linked conveyor belt includes a stabilizer for pushing a conveyed product towards a side rail to stabilize the product during conveyance. The platform member may include an upper portion forming a conveying surface and a lower portion stepped down from the upper port for receiving the forward end of an adjacent platform member. A connector on the lower portion connects the platform member to a corresponding body member in the conveyor belt. The upper portion overlies and protrudes forward from the front of the lower portion. Shaped side rails on the platform member are configured to allow overlapping between adjacent side rails to minimize gaps.

33 Claims, 29 Drawing Sheets

(58) Field of Classification Search
USPC ........................................ 198/850–853, 844.1
See application file for complete search history.

(56) References Cited

U.S. PATENT DOCUMENTS

| | | |
|---|---|---|
| 5,042,648 A | 8/1991 | Garvey |
| 6,173,832 B1 | 1/2001 | Cockayne |
| 6,247,583 B1 | 6/2001 | Coen et al. |
| 6,250,459 B1 | 6/2001 | Coen et al. |
| 6,347,699 B1 | 2/2002 | Ramsey |
| 6,601,697 B2 | 8/2003 | Steeber |
| 6,736,259 B1 | 5/2004 | Funabashi |
| 6,758,328 B2 | 7/2004 | Arai et al. |
| 6,981,584 B2 | 1/2006 | Grabmann |
| 7,207,434 B2 * | 4/2007 | Hartness .............. B65G 17/323 198/468.2 |
| 8,505,715 B2 | 8/2013 | Andreoli et al. |
| 2001/0045346 A1 | 11/2001 | Costanzo |
| 2003/0019730 A1 | 1/2003 | Steeber et al. |
| 2005/0103604 A1 | 5/2005 | Hartness et al. |

\* cited by examiner

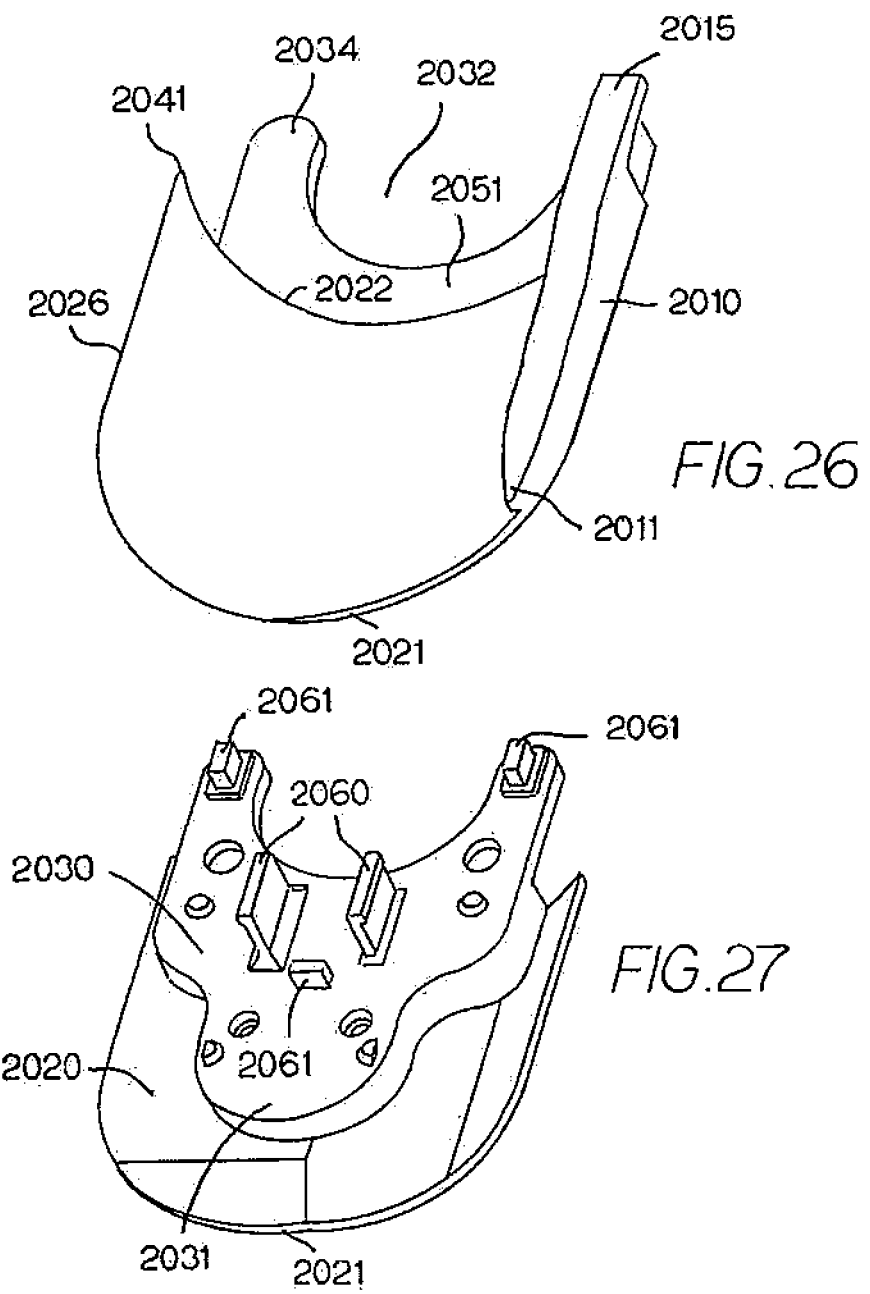

CONVEYOR BELT FOR PRODUCT STABILIZATION

FIELD OF THE INVENTION

The present invention relates generally to the field of conveyor belts and apparatuses for moving objects. More particularly, this invention relates to a chain drive which designed to minimize the effects of vibrations or utilize vibrations advantageously to stabilize a product.

BACKGROUND OF THE INVENTION

Conveying systems are used to convey products through various stages of manufacturing, shipping and storage. Knuckle-linked conveyor belts include a knuckle/socket joint arrangement wherein one end of the link is a rounded knuckle and the opposite end is a socket formed by two extending edges. The knuckle of one link fits into the socket of a neighboring link. The knuckle is able to move in various directions within the socket, which allows for the conveyor system as a whole to curve and move. The interconnected links typically have a platform member connected to or formed at the link's upper surface. The platform member is generally shaped to match the neighboring platform members on other links such that the links can turn while moving around curved sections of the conveying system, yet are also shaped such that the cracks and spaces formed between the links are minimized. Such systems are described in U.S. Pat. Nos. 6,209,716, 6,601,697, and 6,761,264, the contents of which are incorporated by reference.

Vibrations in a conveying system, the transitions between turns and straight, and the inclines and declines of the machine can cause product to move, shift or rotate out of proper orientation during conveying.

SUMMARY OF THE INVENTION

The present invention provides a platform member for a knuckle-linked conveyor belt designed to prevent a conveyed product from moving, shifting or rotating out of proper orientation during conveying. The platform member comprises an upper conveying surface for receiving a product, a bottom surface configured to connect to a body member, a rail formed along a side of the upper conveying surface and means for stabilizing a product against the rail. The stabilizing means may comprise bristles, flexible members, inflexible members, raised ribs, a tiltable wing, high friction rollers, or movable side walls for gripping a product. Nubs or rollers may be included to minimize vibrations during conveying.

According to one aspect of the invention, a platform member for a conveyor belt for transporting objects is provided. The platform member comprises an upper conveying surface for receiving a product, the upper conveying surface extending in length between a lead edge, a lag edge, and in width between a first side edge and a second side edge, a bottom surface configured to connect to a body member, a rail formed along the first side edge, and a stabilizer for pushing a product against the rail.

According to another aspect of the invention, a platform member for a conveyor belt for transporting objects comprises a top portion and a bottom portion. The top portion defines an upper conveying surface for receiving a product. The top portion has a curved leading edge, curved lag edge, a first side edge, a second side edge and a side rail extending along the first side edge. The bottom portion is stepped down and extends rearwards from the top portion. The bottom portion has connectors for connecting the platform member to an associated body member of the conveyor belt.

According to another aspect of the invention, a platform member for a conveyor belt for transporting objects comprises a bottom portion having a forward portion, a rear void and connectors extending downwards and an overlying top portion defining a conveying surface. The overlying top portion overhangs the forward portion of the bottom portion.

According to yet another aspect of the invention, a conveyor belt comprises a plurality of interconnected body members and a plurality of platform members. Each platform member is disposed on a body member. Each platform member comprises a top portion forming a conveying surface and a bottom portion stepped down from and extending back from the top portion for receiving a curved leading edge of a lagging platform member.

BRIEF DESCRIPTION OF THE FIGURES

These aspects and features of the invention, as well as its advantages, are described in more detail in the following description, appended claims, and accompanying drawings, in which:

FIG. 26 is another view of the platform member of FIG. 21;

FIG. 27 is another view of the platform member of FIG. 21;

DETAILED DESCRIPTION OF THE INVENTION

A conveyor belt of an embodiment of the present invention comprises a series of interconnected body members having platform members disposed at the upper side of each body member. The platform members are shaped such that the leading edge of one platform member is configured to be accepted by a trailing edge of the next platform member. The platform members include side rails and a stabilizer, various embodiments of which are described below, for pushing a conveyed product against the side rail. The invention will be described relative to certain illustrative embodiments, though the invention is not limited to the described embodiments.

Figure 1:
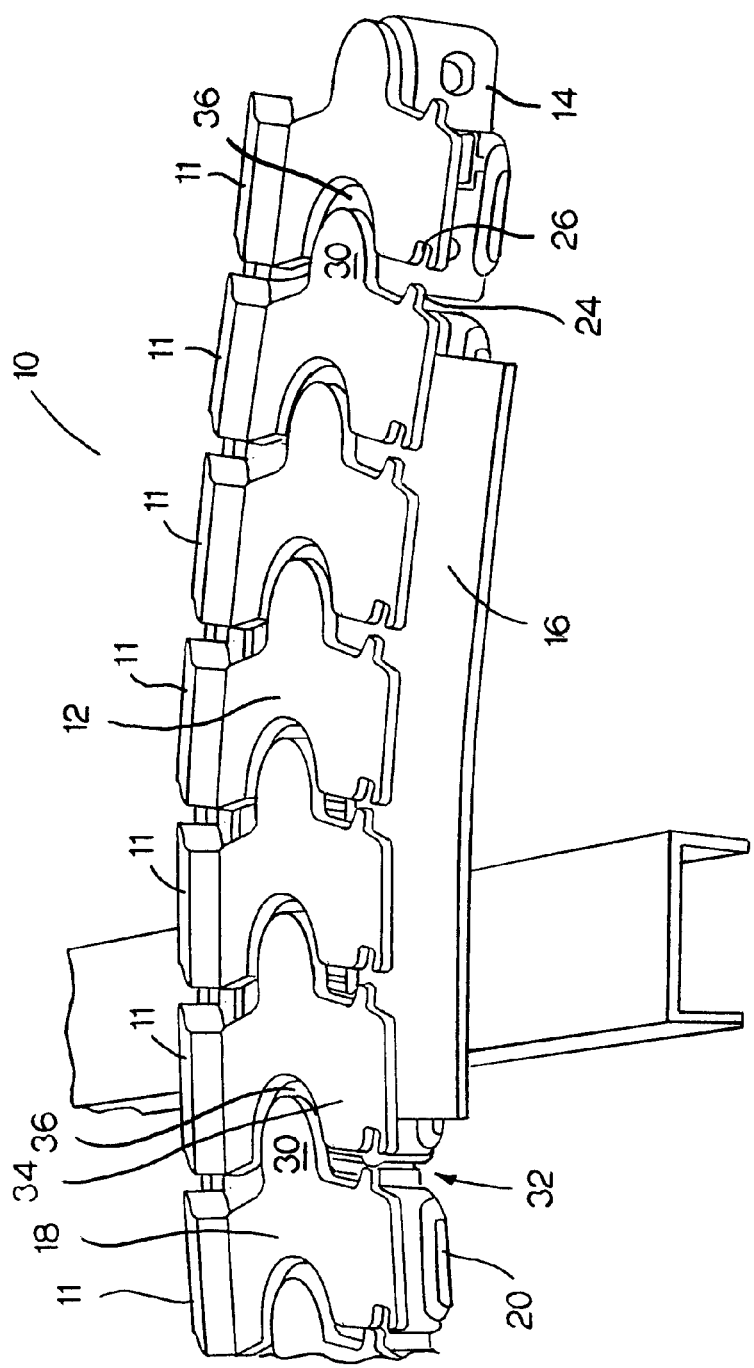
FIG. 1 is a perspective view of an embodiment of the conveyor belt comprising a series of interconnected links that have surface platform members attached thereto.

FIG. 1 shows one embodiment of a conveyor belt 10 suitable for implementing the present invention. The conveyor belt 10 includes a plurality of body members 14 that are essentially a series of interconnected links. A surface platform member 12 is disposed at the upper side of each body member 14. The surface platform members 12 may be separate members individually attached to a respective body member 14, and are shaped such that the leading edge of one surface platform member 12 is configured to be accepted by a trailing edge of the next surface platform member 12. For instance, leading fingers 24 of one surface platform member 12 are configured to be adapted into trailing grooves 26 of the next surface platform member 12. Additionally, a nose portion 30 of one surface platform member 12 is adapted to fit within a void 36 of an adjacent surface platform member 12. A set of bifurcated legs 34 on the surface platform members 12 form the void 36 into which the nose portion 30 of an adjacent surface platform member 12 can mate. The conveyor belt 10 may curve along a curved section of supporting structure 16 due to the loosely mated nose portion 30 and void 36. Also, the loose mating connection between the leading fingers 24 and the trailing grooves 26 allow for substantial conveyor belt 10 curvature. Each platform member further includes a rail member 11 formed along a side of the platform member 12.

Articles are placed on a top conveying surface 18 of the surface platform members 12 and are conveyed as the plurality of body members 14 move along supporting structure 16. The body members may be fitted with flanges 20 on either end in order to ride the supporting structure 16. Drive indentations 32, sometimes known as "drive dogs", are provided between the flanges 20 and the interconnected body members 14. Each module may have a plurality of drive indentations. A sprocket tooth fits into the drive indentation as shown while a second sprocket tooth fits in the space created between modules. A drive wheel (not shown) engages the drive indentations 32 and propels the conveyor belt 10 along the supporting structure 16.

Figure 2A:
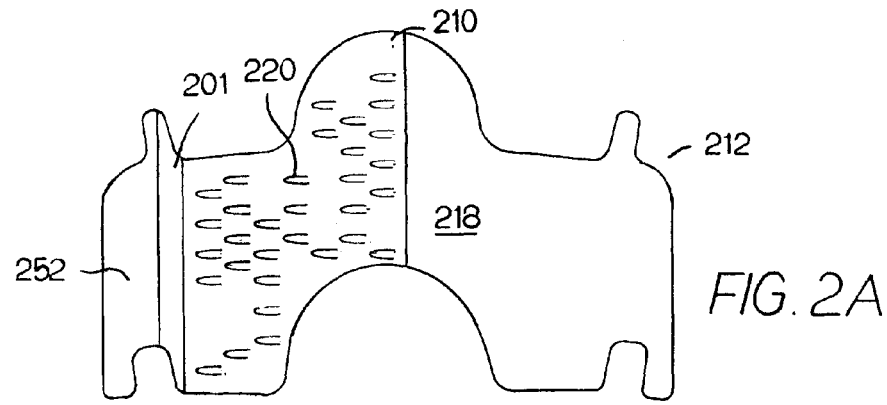
FIG. 2A is a top view of a platform member for a conveyor belt that includes bristles for translating vibrations into product movement.

The platform members are configured to facilitate product transport and stabilization. For example, in one embodiment, shown in FIGS. 2A and 2B, the platform member 212 includes a stabilizer for pushing conveyed products wards a side rail, illustrated as bristles that translate vibrations in the conveying system to motion of the product towards a rail on the platform member. Each platform member 212 includes a rail member 201 extending along a first side. The upper conveying surface 218 of the platform member 212 forms a channel 210 for receiving a product. Bristles 220 that are angled towards the rail 201 are formed in the channel 210. The upper surface 218 may be sloped in an outer region 218. to guide product towards the rail 201. An edge 252 may be provided on the opposite side of rail member 201 from the channel 210. When the system vibrates, the angled bristles 220 direct the product towards the rail 201, holding the product within the channel 210.

Figure 2B:
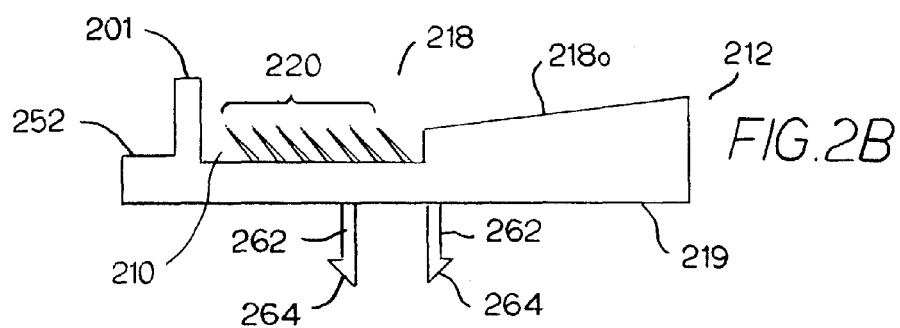
FIG. 2B is an end view of the platform member of FIG. 2A.
Figure 3A:
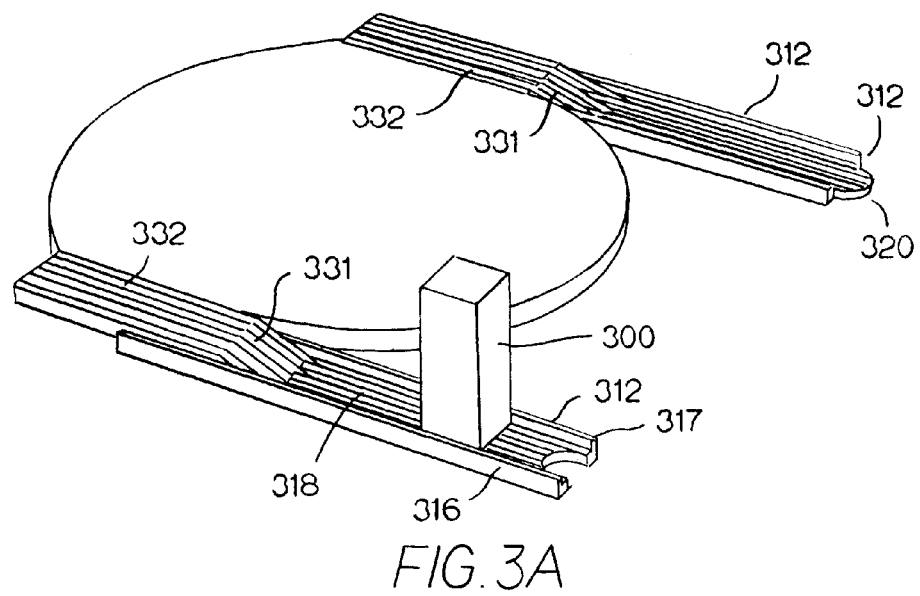
FIG. 3A-3D illustrate an accumulation conveying system employing a platform member having raised ribs formed in a trough for containing a product.
Figure 3B:
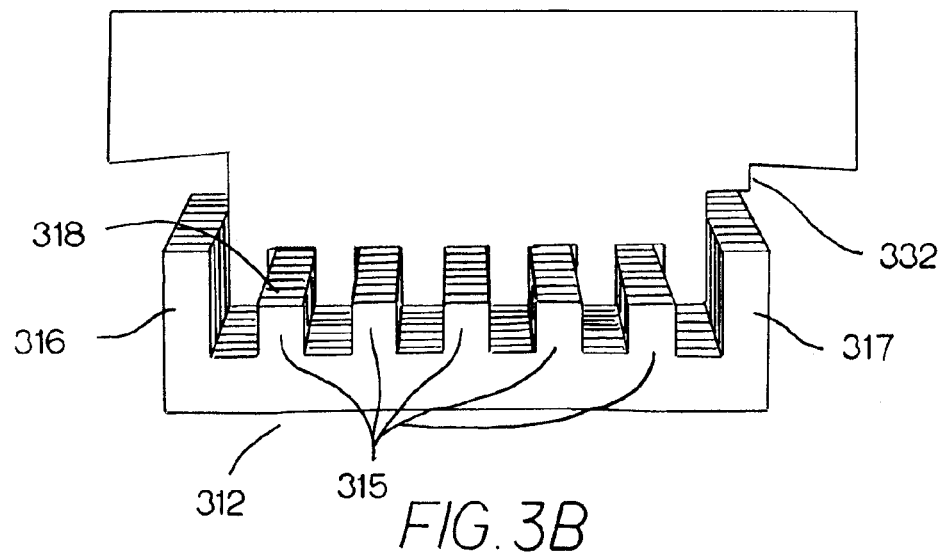
Figure 3C:
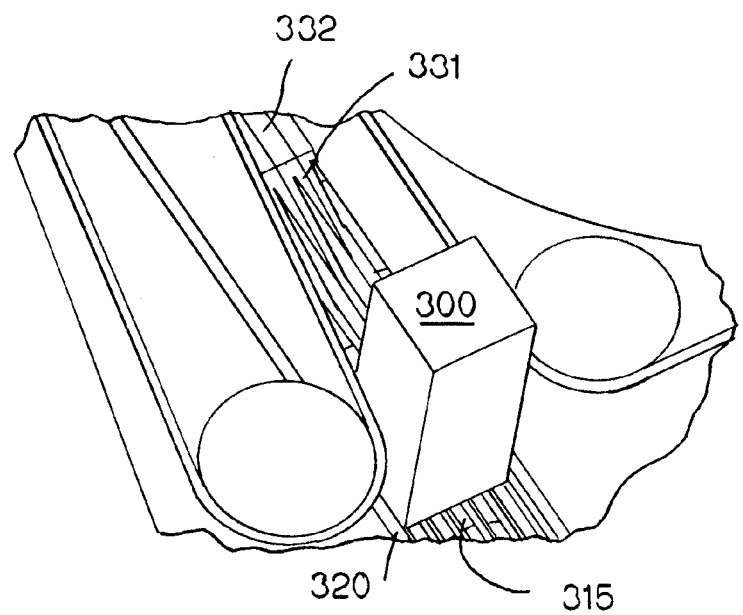
Figure 3D:
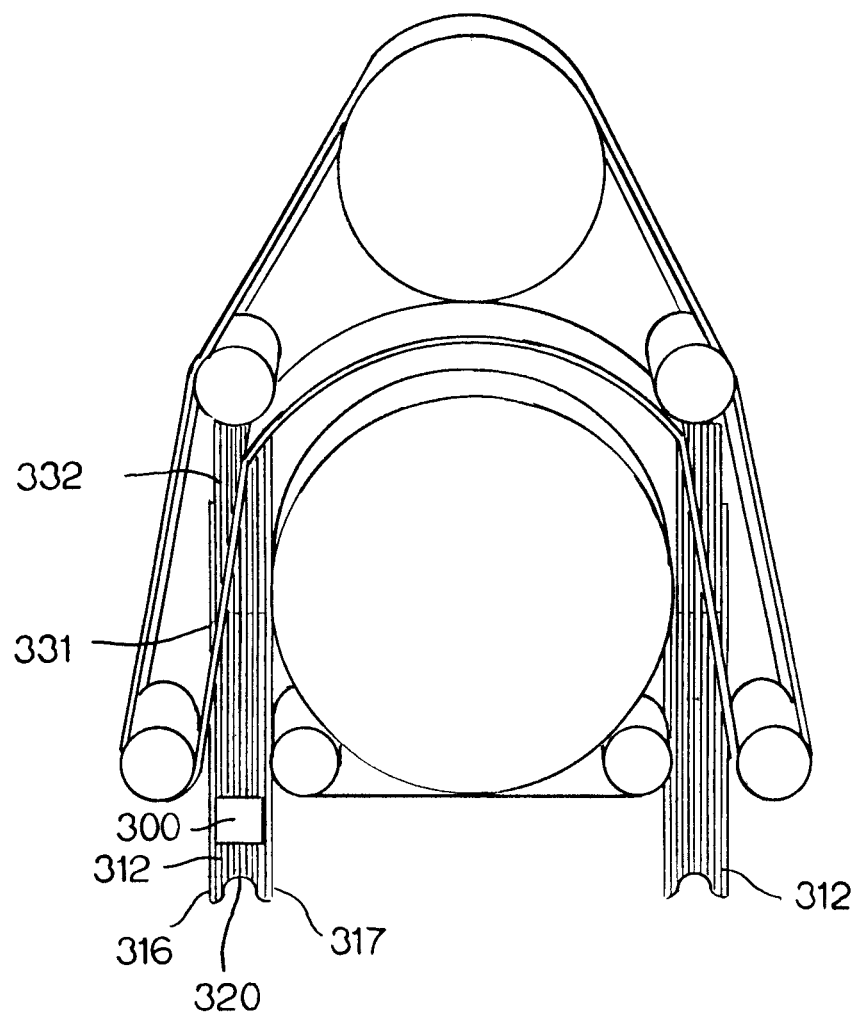

As shown in FIG. 2B, the platform member 212 includes spring tabs 262 extending from a lower surface 219 opposite the conveying surface 218. These spring tabs 262 may be resilient, substantially rectangular, and integral with the surface platform member 212. The spring tabs 262 are provided with a detent latching member 264 on one end. The detent latching member 264 may be received in a cavity (not shown) with a mating detent member (not shown) in a body member in order to securely fasten the surface platform member 212 onto the body member.

In another embodiment of the invention, the platform member 312 may form a simple trough between two side rails to prevent movement or rotation of a product 300. FIGS. 3A-3D illustrate an embodiment of a raised rib trough in a platform member. Each platform member 312 includes side rails 316, 317 forming a trough 320 therebetween in the conveying surface 318. Raised ribs 315 between the side rails within the trough 320 capture a product. When transferring a product onto or from the platform member in a conveying system 300, fingers 331 on a transferring device 332 reach into channels between the ribs 315 to lift product out of the trough.

Figure 4A:
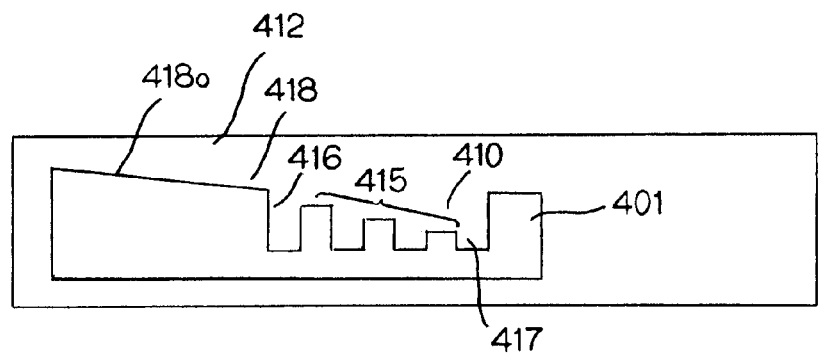
FIG. 4A is an end view of a platform member including stepped ribs in an upper conveying surface according to another embodiment of the invention.

In another variation, shown in FIG. 4A, a platform member 412 for a conveying system includes stepped ribs 415 in an upper conveying surface 418 for pushing a product towards a side rail. The platform member 412 includes a side rail 401, a sloped portion $418_o$ in the upper surface 418 and a channel 410 between the side rail and sloped portion of the upper surface. Each rib 415 is stepped down from a higher level 416 to a lower level 417 adjacent the side rail 401 to allow one platform member 412 to accommodate a variety of product sizes within the channel 410. Product can slide down the ribs 415 towards the rail 401, but not go back up or rotate within the channel 410.

Figure 4B:
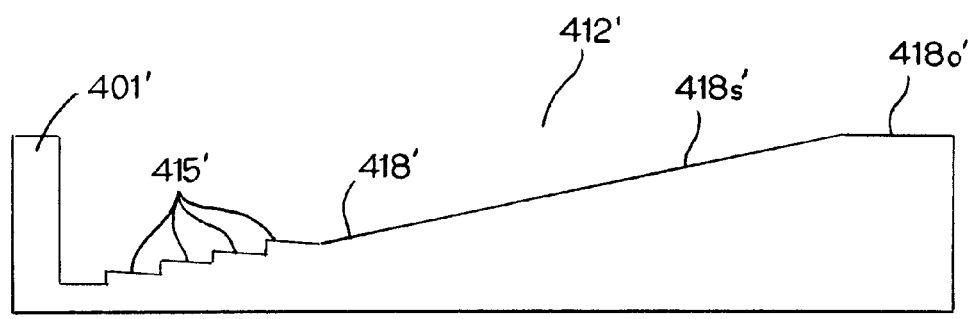
FIG. 4B is an end view of a platform member including steps formed in an upper conveying surface according to another embodiment of the invention.

According to another embodiment, shown in FIG. 4B, a platform member 412' for a conveying system includes a stabilizer comprising steps 415' formed in an upper conveying surface 418'. The platform member also includes a side rail 401' adjacent to the bottom of the steps 415'. The upper conveying surface 418' includes a flat portion $418o'$, and an intermediate sloped portion $418s'$ between the flat portion $418o'$ and the steps 415'.

Figure 5:
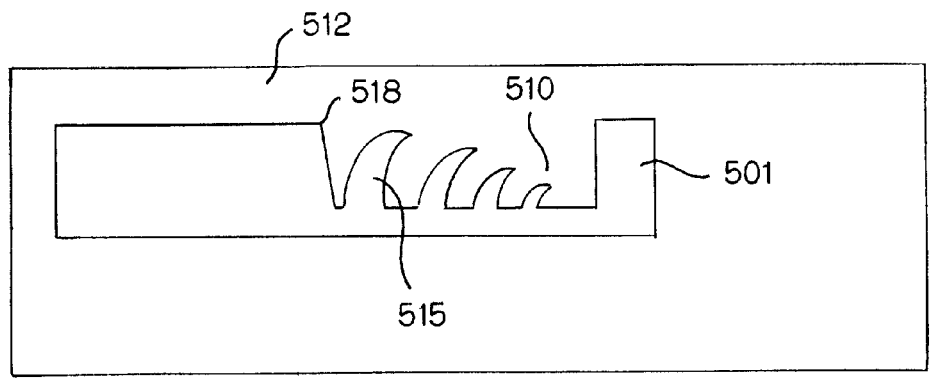
FIG. 5 is an end view of a platform member including fingers disposed in a channel formed in an upper conveying surface of the platform member.

In another embodiment of the invention, shown in FIG. 5, a platform member 512 for a conveying system includes a stabilizer comprising semi-flexible or flexible fingers 515 disposed in a channel 510 formed in an upper conveying surface 518. The fingers allow product to slide down towards the rail 501. If product tries to move, the fingers 515 can open to better contain the product and prevent movement of the product away from the rail 501. The upper conveying surface 518 may include a sloped portion to facilitate containment of the product against the rail 501.

Figure 6:
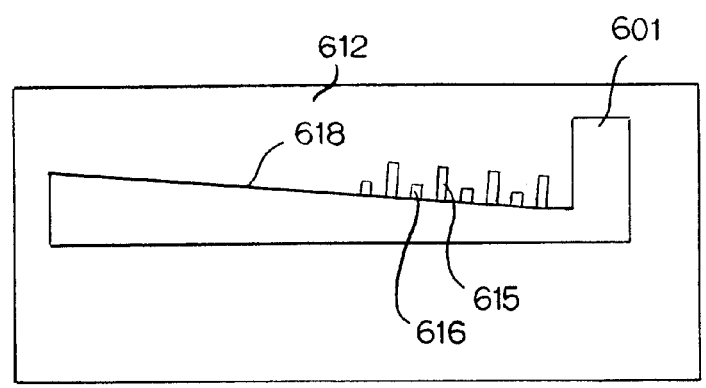
FIG. 6 is an end view of a platform member including alternating flexible and less flexible members formed in an upper conveying surface of the platform member.

A similar embodiment of a platform member 612 including a stabilizer for holding a product in place during conveyance is shown in FIG. 6. The platform member 612 includes a side rail 601, a sloped upper surface 618 and a combination of flexible members 615 and less flexible members 616 extending from the sloped upper conveying surface 618. The members 615, 616 keep the product in place as the members deform. In the illustrative embodiment, the more flexible member 615 are taller than the less flexible member 616, and the flexible members 615 alternate with the less flexible members 616.

According to another embodiment, a platform member may have a modified upper surface that promotes one-way movement of a product towards a side rail. For example, the surface may be smooth in one direction to allow product to move easily towards a rail or other alignment/registration surface and sharp in the other direction to hold product along an alignment/registration surface.

Figure 7C:
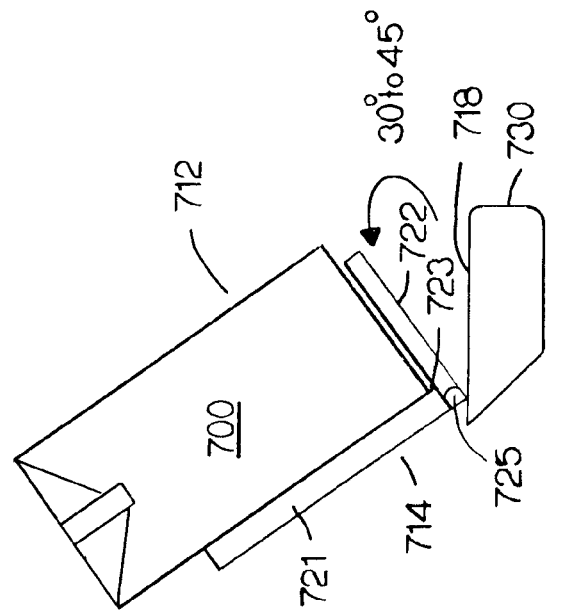
FIGS. 7A-7C illustrate a platform member including a tiltable wing according to another embodiment of the invention.
Figure 7B:
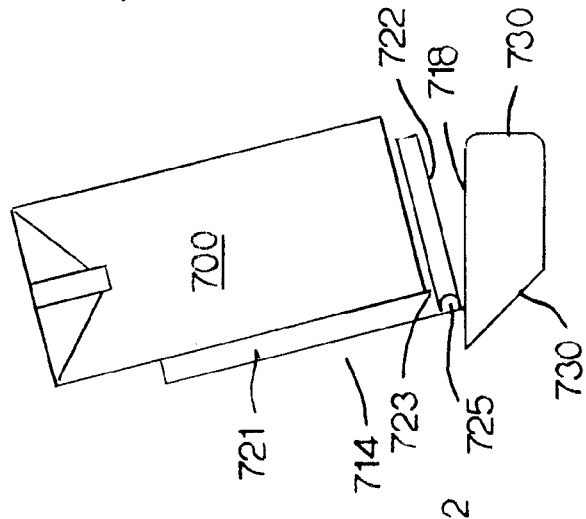
Figure 7A:
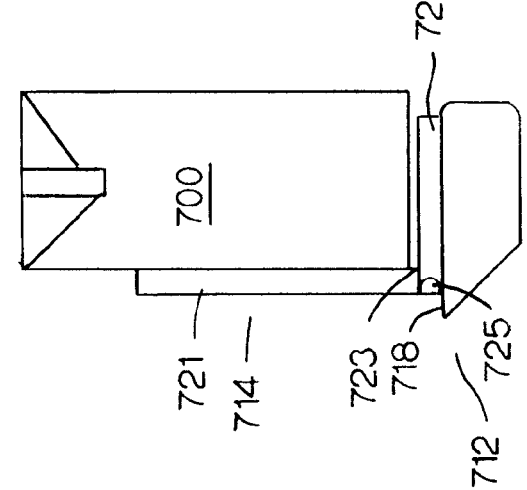

FIGS. 7A, 7B and 7C illustrate another embodiment of a platform member 712 having a stabilizer for stabilizing a product against a side rail 721 during transport. The platform member 712 is configured to stabilize a product 700 during transport. The platform member 712 includes a tiltable wing 714 for receiving the product 700. The tiltable wing 714 includes two perpendicular surfaces 721, 722 joined at a corner 723. The tiltable wing 714 pivotally connects to an upper surface 718 of a lower base 730 at a pivot point 725. At an infeed position, shown in FIG. 7A, the tiltable wing 714 rests at 0°, with the lower surface 722 flush against the base 730. In transition, shown in FIG. 7B, the wing 714 tilts to secure the product 700. During transport, shown in FIG. 7C, the wing 714 remains in a tilted position, between about 30° and about 45° relative to the base 730 to stabilize the product. Rails, springs or another device attached to an accumulation spider can be used to control the position of the tiltable wing 714.

Figure 8A:
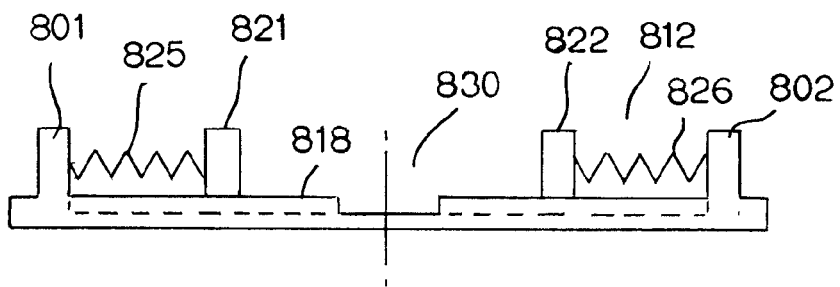
FIG. 8A-8C illustrate a platform member having movable walls according to another embodiment of the invention.
Figure 8B:
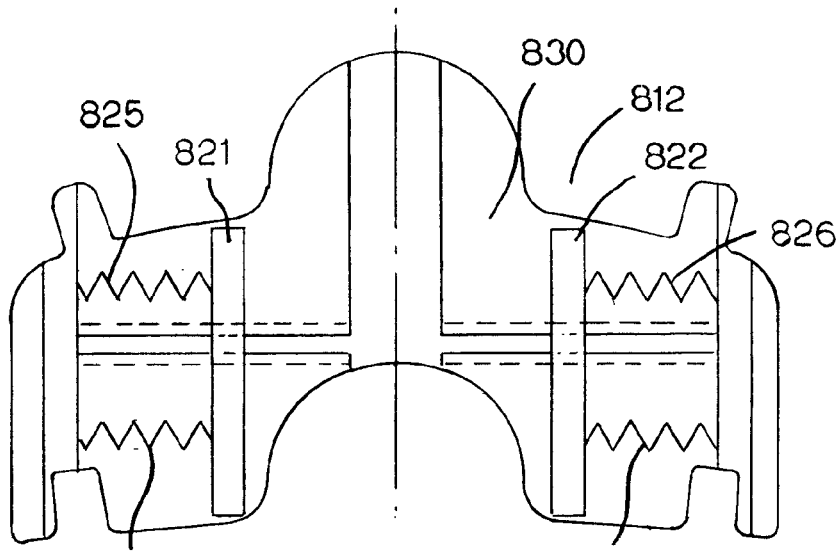
Figure 8C:
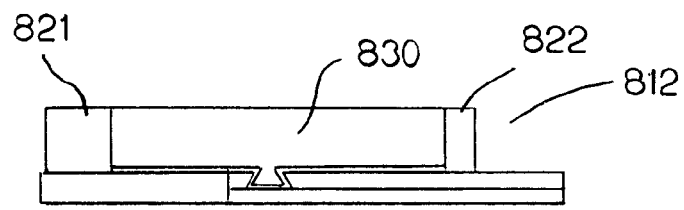

FIGS. 8A, 8B and 8C illustrate another embodiment of a platform member 812 having a stabilizer for stabilizing a product during transport. The platform member 812 of FIGS. 8A-8C utilize a gripper, illustrated as movable walls (side rails) 821, 822 that move in and out from outer side rails 801, 802 of the platform member to grip a product. The walls 821, 822 form variable channel 830 in an upper conveying surface 818. In one embodiment, springs 825, 826 extending between outer side rails 801, 802 and the movable walls 821, 822 allow movement of the walls to accommodate a product.

Figure 9A:
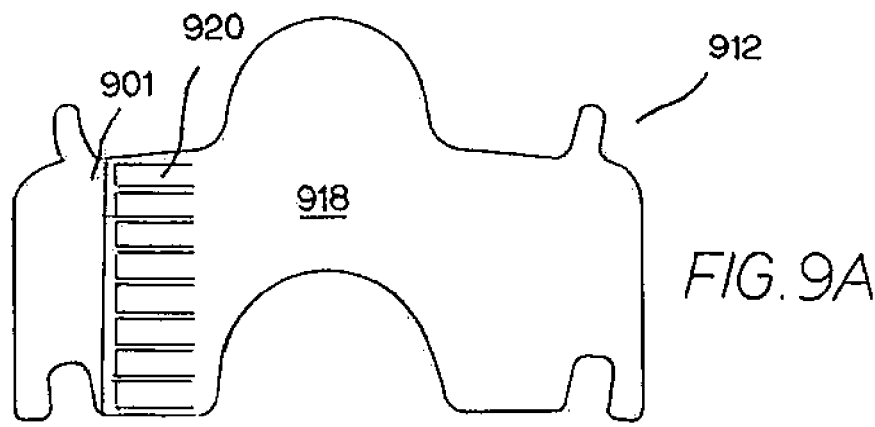
FIGS. 9A and 9B illustrate a platform member including flexible fingers extending horizontally into channel for stabilizing a conveyed product.
Figure 9B:
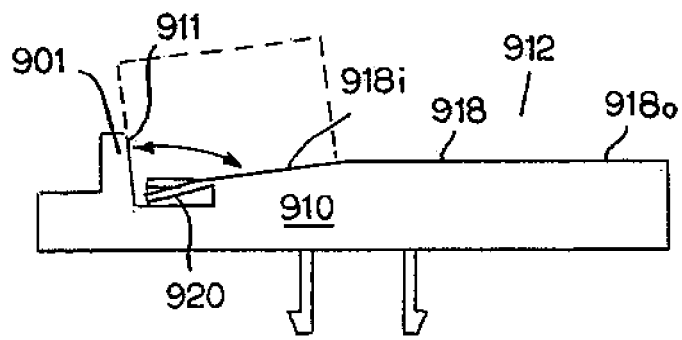

Referring to FIGS. 9A and 9B, another embodiment of a platform member 912 employs a stabilizer comprising a row of flexible fingers 920 extending substantially horizontally into a channel 910. The platform member 912 includes an upper conveying surface 918 including a horizontal portion $918_o$, a sloped portion $918_i$ and the channel 910, which is formed next to a side rail 901. When a product 900 is placed in the channel 910, the fingers 920 deflect, causing the product to align against the side rail 901 and prevent rotation. The surrounding non-deflected fingers prevent the product from sliding on the conveyor belt. In the embodiment of FIGS. 9A and 9B, the inner surface 911 of the side rail is perpendicular to the sloped portion $918_i$ of the upper conveying surface to facilitate stabilization of the conveyed product 900.

Figure 10A:
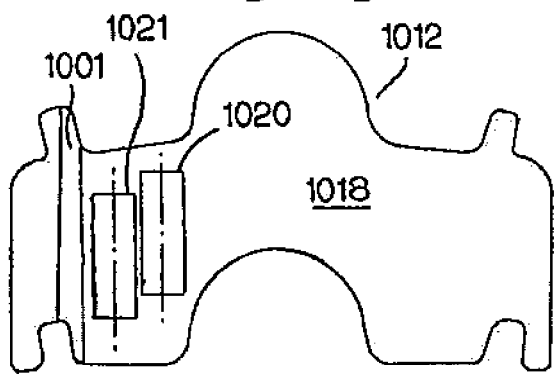
FIGS. 10A and 10B illustrate a platform member including high friction rollers for stabilizing a conveyed product.
Figure 10B:
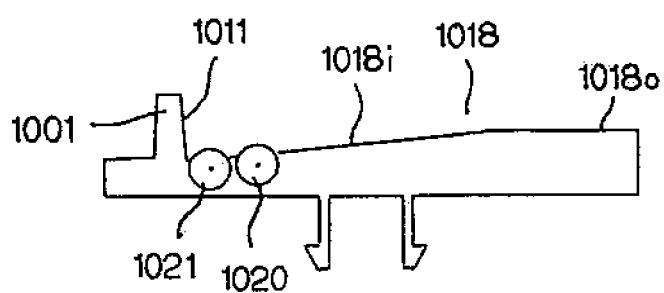

FIGS. 10A and 10B illustrate another embodiment of a platform member 1012 having a stabilizer suitable for stabilizing a conveyed product against a side rail. The platform member 1012 includes high friction rollers 1020, 1021 disposed in cavities and extending from the upper conveying surface 1018. The upper conveying surface 1018 includes an outer horizontal portion 10180, and intermediate sloped portion 1018. The high friction rollers 1020, 1021 allow a product to roll towards a side rail 1001 to contain the product. The high friction surface of the rollers 1020, 1021 prevents the product from sliding away from the rail or forward on the conveyor belt. The rollers also inhibit rotation of the product. The inner surface 1011 of the side rail 1001 may be perpendicular to the sloped portion $1018_i$ of the upper conveying surface to facilitate stabilization of the conveyed product.

Another embodiment of a conveying system employs pop-up flights or walls to stabilize a conveyed product. The pop-up flights or walls provide a surface to prevent product from sliding on the conveyor belt, as well as a surface for product alignment.

Figure 11:
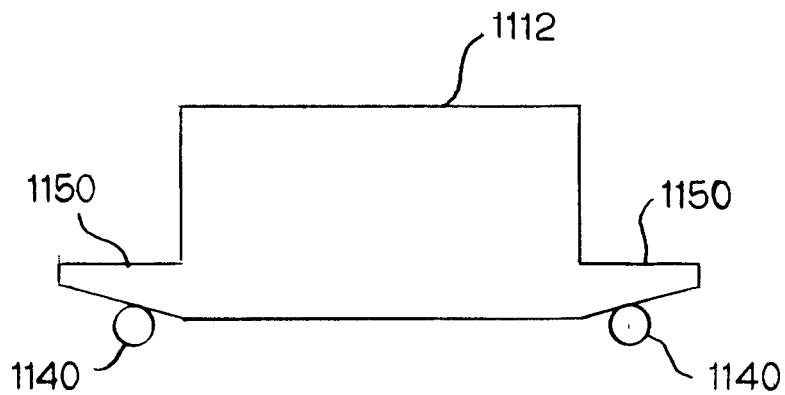
FIG. 11 is an end view of a platform member including nubs for reducing friction.
Figure 12:
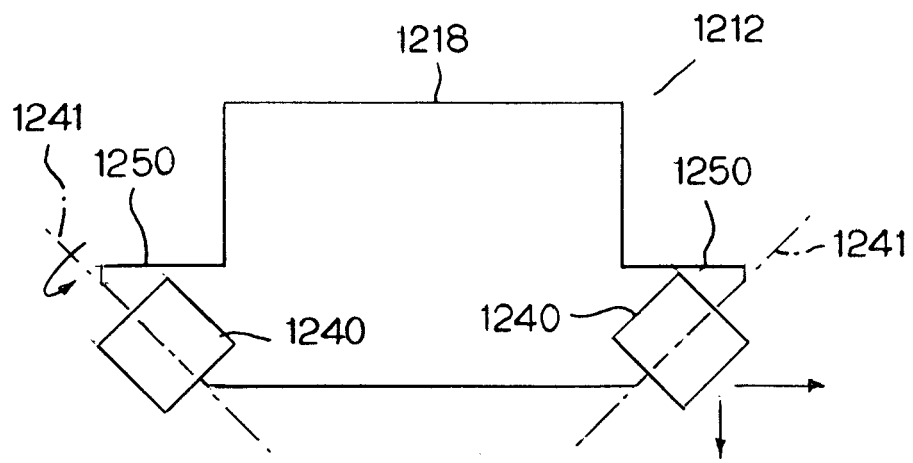
FIG. 12 is an end view of a platform member including rollers for reducing friction.
Figure 13:
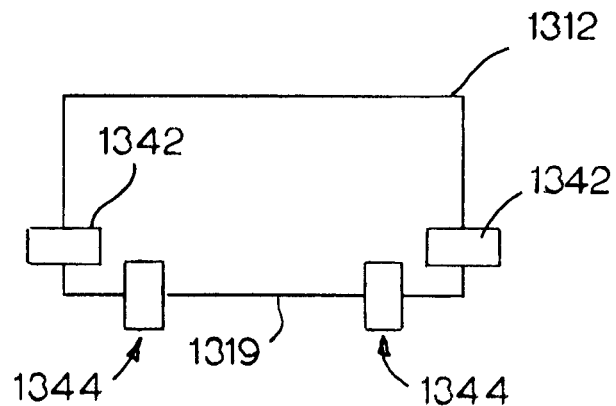
FIG. 13 is an end view of a platform member including two sets of rollers for reducing friction in different portions of a conveyor.

According to another embodiment of the invention, a platform member may include rollers or nubs to reduce friction and reduce vibrations in the system and stabilize a product. For example, as shown in FIG. 11, nubs 1140 coupled to flanges 1150 on the bottom of a platform member 1112 reduce a contact area between the platform member and a supporting structure to reduce vibrations in the system, thus stabilizing a conveyed product. As shown in FIG. 12, a platform member 1212 may include rollers 1240 in flanges 1250. Each roller 1240 may be freely rotatable about an axis of rotation 1241, which is angled relative to the top conveying surface 1218. The rollers 1240 are positioned to reduce friction in straight or curved areas of the conveyor. In another embodiment, shown in FIG. 13, two sets of rollers are used to reduce friction. A first set of rollers 1342 is disposed in a side of a platform member 1312 to reduce friction during turns in the conveyor. A second set of rollers 1344 is disposed in a bottom surface 1319 to reduce friction during straight areas of the conveyor.

Figure 14:
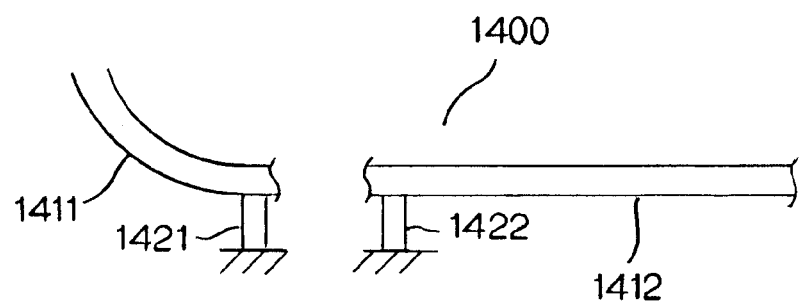
FIG. 14 is a diagram of a portion of a conveyor system having curved portion isolated from a straight portion.
Figure 15:
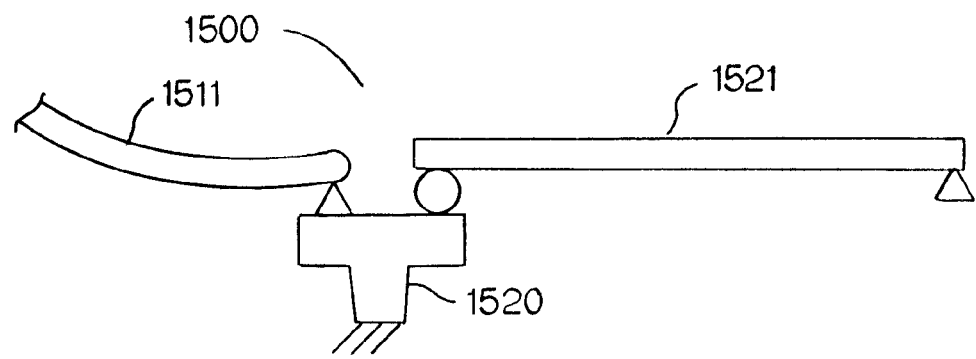
FIG. 15 is a diagram of a portion of a conveyor system including a t-shaped support column.
Figure 16:
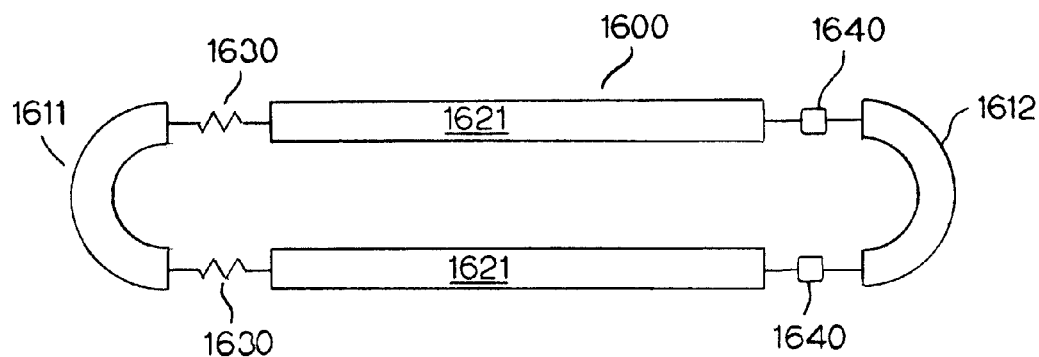
FIG. 16 is a diagram of a conveyor system including springs and—or dampers between curved sections and straight sections.
Figure 17:
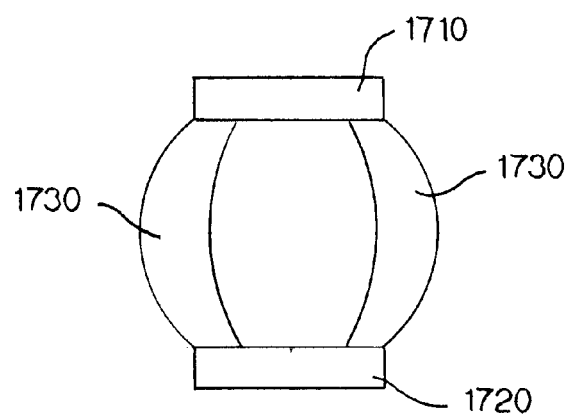
FIG. 17 is a cross-sectional diagram of a portion of a conveyor system including rubber spring isolators.

Another approach for reducing vibrations in a conveying system involves isolating curves from straight portions of the conveying system. Isolation can be achieved using different support columns for the different sections, dampers, such as springs, or through other suitable means. For example, as shown in FIG. 14, a conveyor system 1400 may include a curved portion 1411 and a straight portion 1412. The curved portion 1411 is supported by a first column 1421 that is separate from a second column 1422 supporting the curved section 1412. In another embodiment, shown in FIG. 15, a conveyor system 1500 with a curved section 1511 and a straight section 1521 includes a t-shaped support column 1520. The curved section 1511 may be pivotally connected to the support column 1520 to help reduce vibrations. As shown in FIG. 16, a damper or spring may be used in a conveyor system 1600 to reduce vibrations. The conveyor system 1600 includes curved sections 1611, 1612 and straight sections 1621, 1622. Springs 1630 connecting the ends of the first curved section 1611 and the first ends of the straight sections 1621, 1622 help reduce vibrations in the conveyor system 1600. Alternatively or in addition to the springs 1630, dampers 1640 may connect the second curved section ends to the second ends of the straight sections 1621, 1622. As shown in FIG. 17, rubber spring isolators may be used to minimize vibrations in a conveyor system. The rubber spring isolators 1730 connect the carryway 1710 to the frame 1720 of the conveyor to dampen vibrations.

Figure 18A:
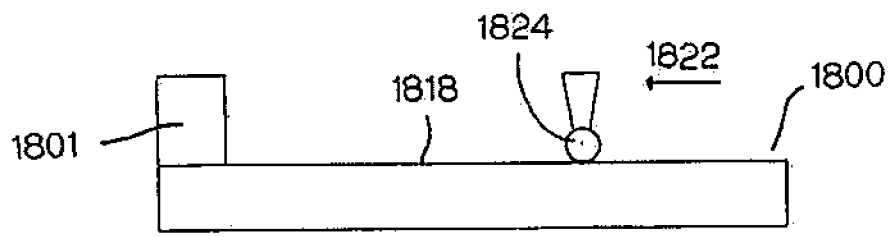
FIGS. 18A-18C are side, cross-sectional and top views of a platform member including a slidable, pivotable wall for containing a product, according to another embodiment of the invention.
Figure 18B:
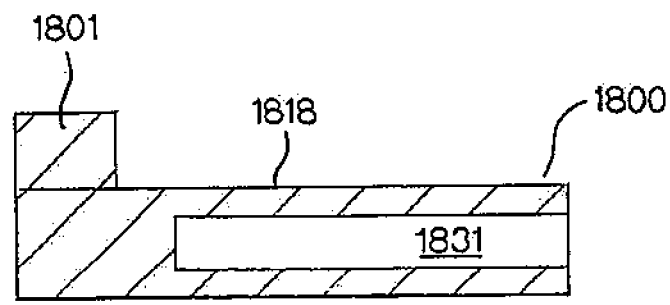
Figure 18C:
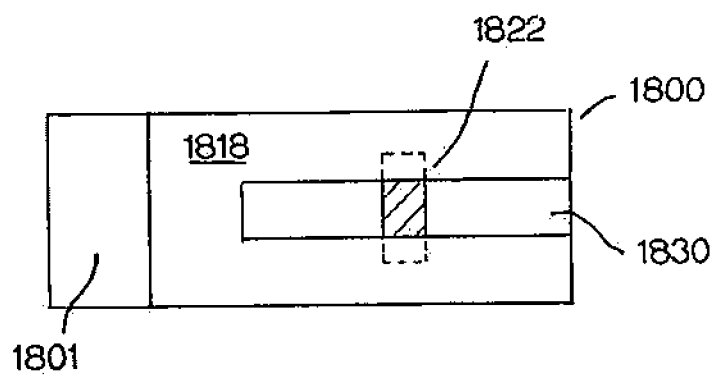
Figure 19:
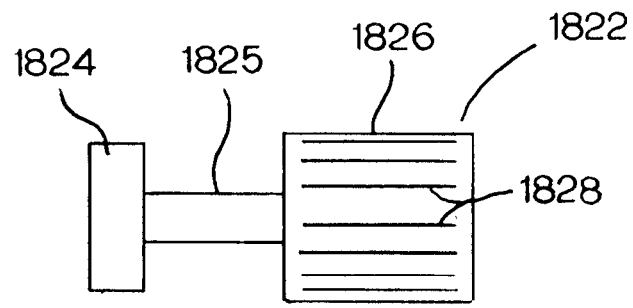
FIG. 19 is a top view of an embodiment of a slidable, pivotable wall suitable for use in the platform member of FIGS. 18A-18C.
Figure 21:
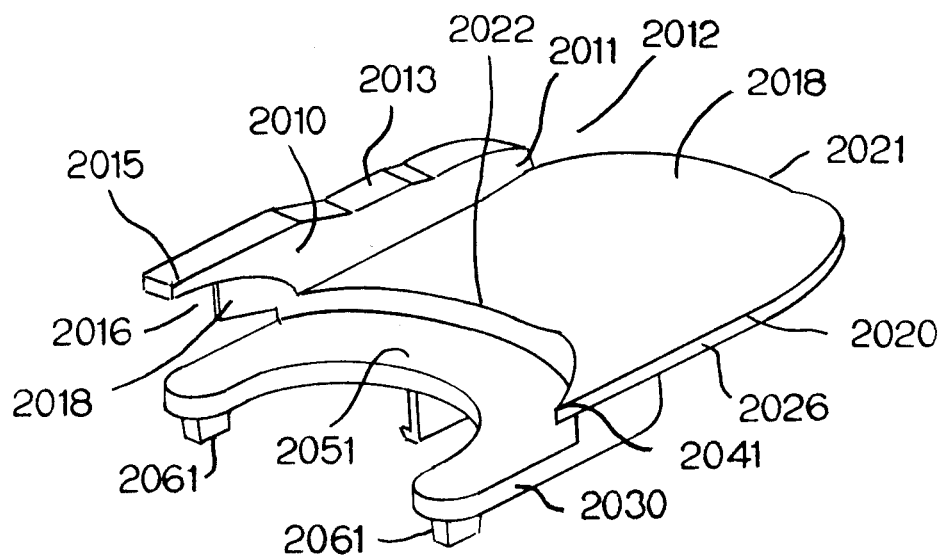
FIG. 21 is an isometric view of a platform member of the conveyor belt of FIGS. 20A and 20B.
Figure 20A:
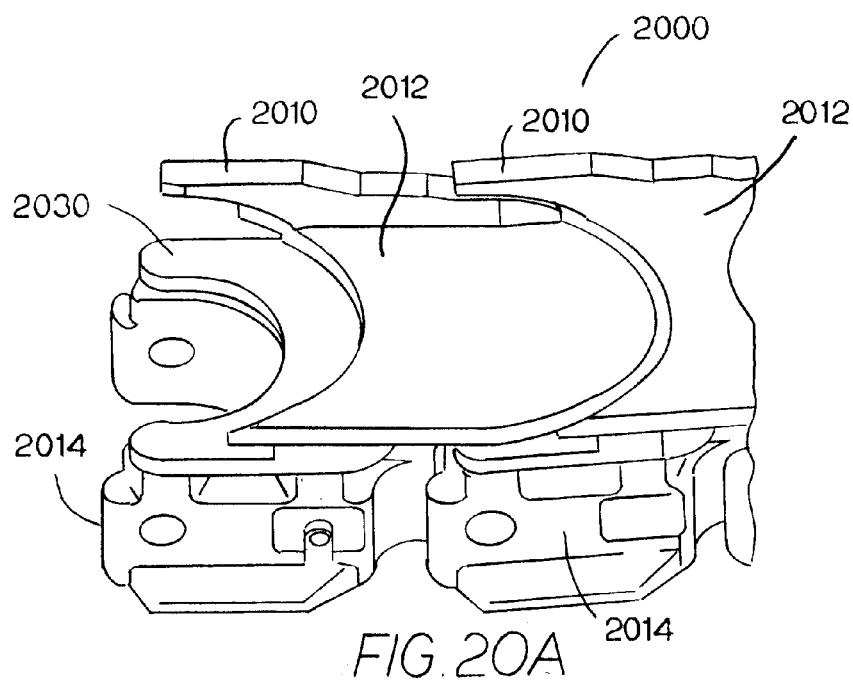
FIG. 20A is an isometric view of a portion of a conveyor belt comprising linked base members and platform members having stepped down shelves and shaped side walls according to another embodiment of the invention.
Figure 20B:
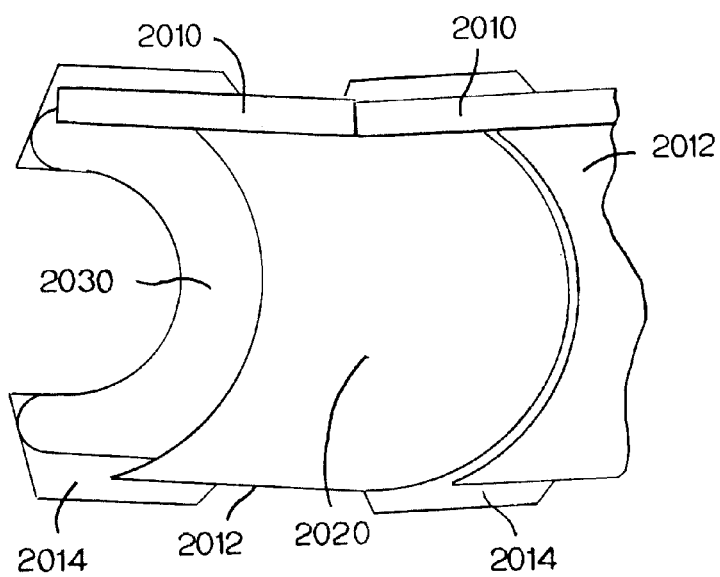
FIG. 20B is a top view of the portion of the conveyor belt of FIG. 20A.

FIGS. 18A-C illustrate anther embodiment of a platform member 1800 having a stabilizer for stabilizing a conveyed product. The platform member 1800 includes a slidable, pivotable wall 1822 for containing the product conveyed on an upper surface 1818 by selectively pushing the conveyed product towards a side rail 1801. The wall 1822 can pivot or fold down for side transfers of product off the platform member 1800. As shown in FIGS. 18B and 18C, the platform member 1800 may include a slot 1830 in the upper surface 1818 and channel 1831 below the slot for slidably receiving the wall 1822. The slidable, pivotable wall 1822, shown in FIG. 19, includes a bottom pivot 1824, a neck 1825 and an upper wall portion 1826. The upper wall portion 1826 may include raised ribs 1828 to allow the product to slide over the platform member when the wall 1822 is in a down position. The ribs 1828 can strengthen the wall 1822 while maintaining a low profile. An actuator (not shown) selectively slides the pivot portion 1824 of the wall 1822 within the channel 1831 to move the wall closer to or farther from the side rail 1801 and selectively pivots the upper wall portion 1826 about the pivot to lower or raise the upper wall portion 1822.

FIGS. 20A-29 illustrate another embodiment of a conveyor belt 2010 including a platform member 2012 for conveying and stabilizing a conveyed product. The platform member 2012 is placed over and connects to a body member 2014. A series of body members 2014 are hingedly connected together, with the platform members above forming a conveying surface.

Each platform member 2012 in the embodiments of FIGS. 20A-29 includes an upper portion 2020 and a lower portion 2030. The upper portion 2020 forms a conveying surface 2018 for conveying products, while the lower portion 2030, which is stepped down from the upper portion, forms a shelf for receiving the front of an adjacent upper portion, and includes a connector for connecting the platform member 2012 to an associated body member. The upper portion 2020 overlies and protrudes forward from the front of the lower portion 2030.

The upper portion 2020 has a curved leading edge 2021 and a curved lag edge 2022. The upper portion spans in width from a first side edge 2025 to a second side edge 2026. A conveying surface 2018 is defined between the curved leading edge, curved lag edge, first side edge and second side edge. The upper portion further includes a side rail 2010 extending along and above the first side edge 2025. The platform member 2012 may include a stabilizer for pushing a conveyed product towards the side rail 2010.

The upper portion 2020 may be non-planar. For example, in the illustrative embodiment, the upper portion forms a flat, substantially horizontal conveying surface 2018a adjacent the side rail, a sloped surface 2018i sloping upwards from the surface 2018a towards the side edge 3026 and an upper surface 2018o adjacent the sloped surface. As shown, top of the second side edge 3026 is therefore higher than conveying surface portion 2018a adjacent the side rail 2010, which has a lower elevation.

The illustrative curved leading edge 2021 spans the width of the upper portion and merges with side edges 2025, 2026. The curved lag edge 2022 is complementary to the lead edge 2021 so that the lead edge 2021 of a lag platform fits into the void formed by the lag edge 2022 of a lead platform. The side edges 2025, 2026 form tapered tails 2042, 2041 at the intersection with the lag edge 2022. The curved lead and lag edges allow rotation of adjacent platform members relative to each other without creating large gaps in the conveying surface.

The side rail 2010 helps retain conveyed products on the platform member and is designed to facilitate pivoting of adjacent platform members relative to each other. Each side rail 2010 mates with adjacent side rails in the series of platforms forming a conveyor belt. As shown, each side rail 2010 extends along and overhangs the rear of the side edge 2025. The front tip 2011 of the side rail tapers in both height and width at the intersection between the curved lead edge 2021 and the side edge 2025. The top of the tip may be curved downwards. The overhanging rear portion 2015 of the side rail 2010 forms a void 2016 between the lower portion 2030 for receiving the tip 2011 of a lagging side rail. The void 2016, formed by curved surface 2017, 2018, tapers in height and width. The interface between the side rails allows for rotation of adjacent platform members relative to each other, for example, to follow a curved conveyance direction, while minimizing large gaps.

The bottom portion 2030, which may be integrally formed with the upper portion, includes a nose portion 2031 at a lead edge and a void at 2032 a lag edge. The nose portion is adapted to fit within the void on the bottom portion of an adjacent platform member. A set of bifurcated legs 2034 on the bottom portion form the void 2032 into which the nose portion 2031 of an adjacent surface platform member can mate. The illustrative legs 2034 have rounded tips.

Figure 22:
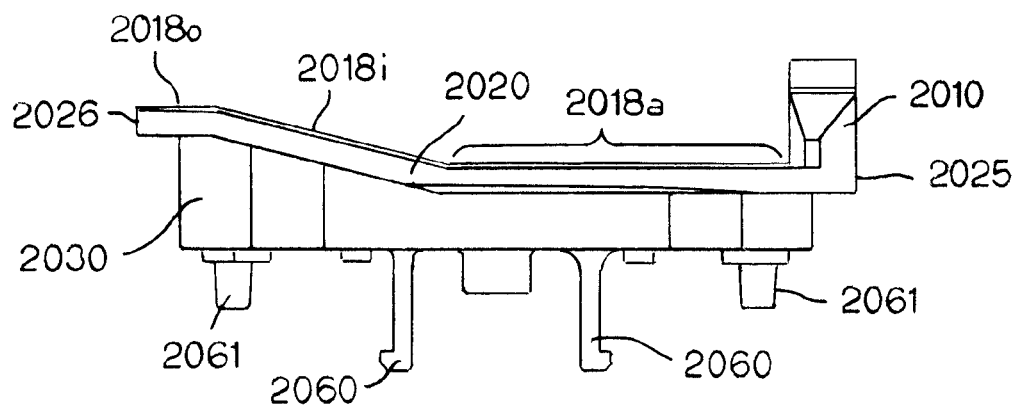
FIG. 22 is a front view of the platform member of FIG. 21.
Figure 23:
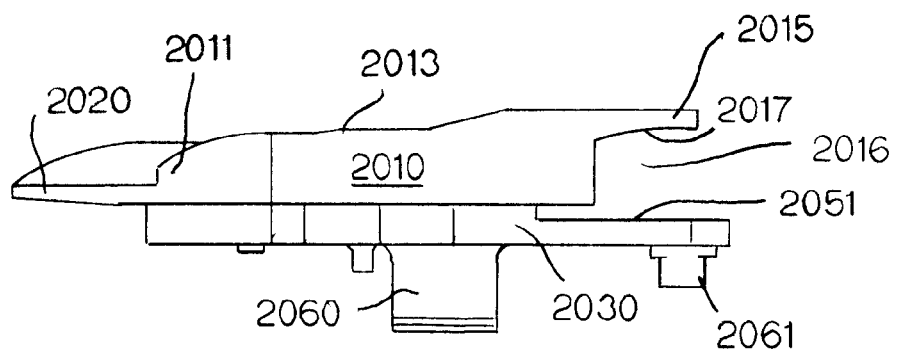
FIG. 23 is a side view of the platform member of FIG. 21.
Figure 24:
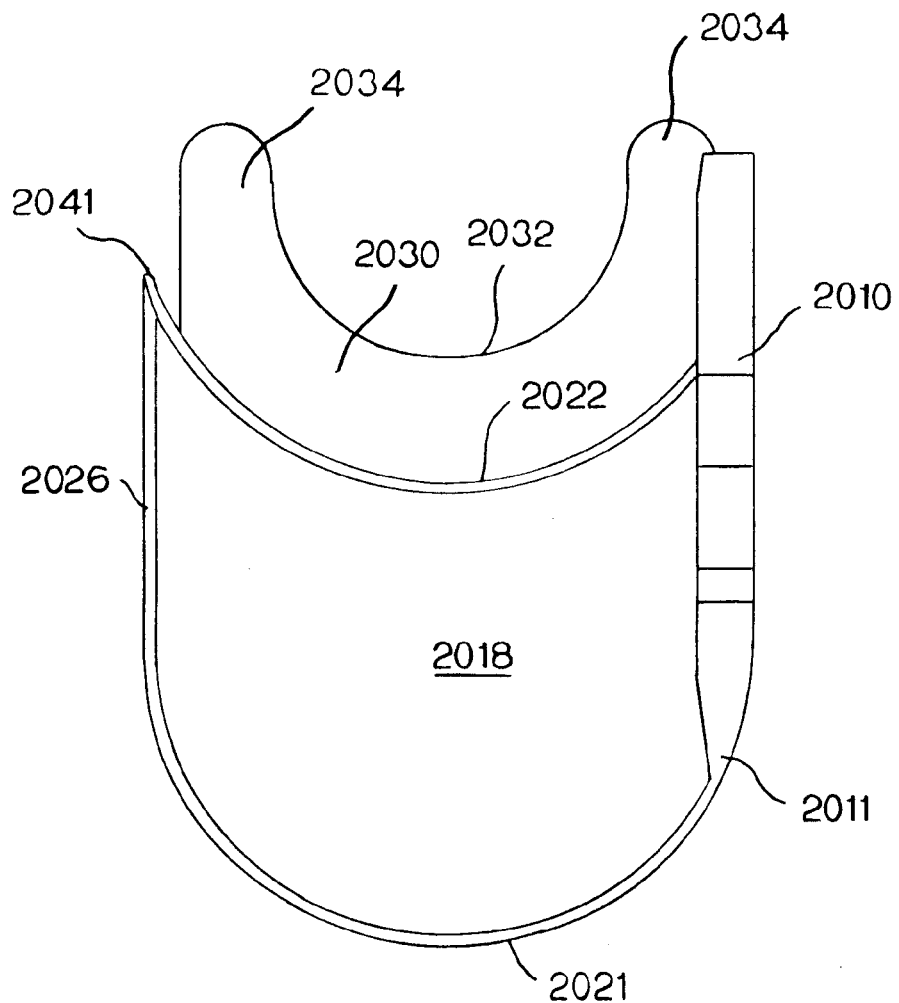
FIG. 24 is a top view of the platform member of FIG. 21.
Figure 25:
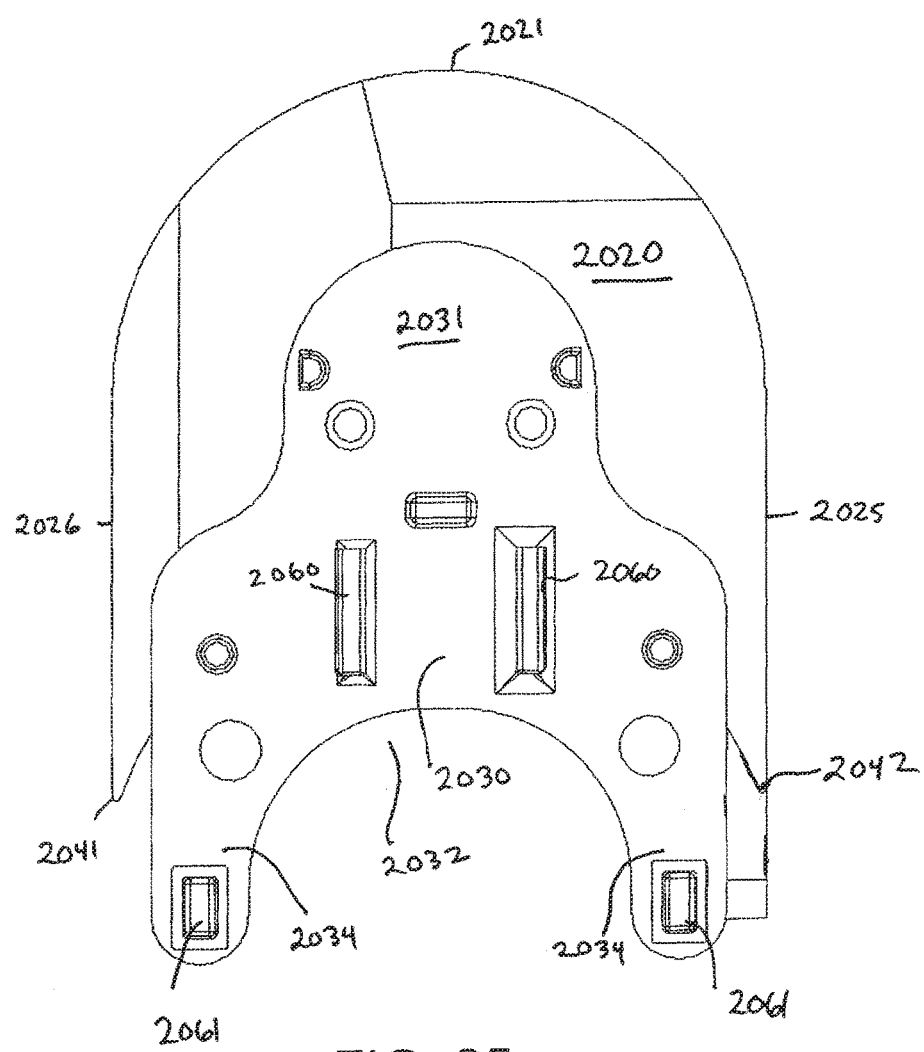
FIG. 25 is a bottom view of the platform member of FIG. 21.

The bottom portion forms a shelf 2051 for receiving the front of a lagging upper portion, allowing overlap between adjacent platform members 2012 in a conveying belt. The shelf surface 2051 formed by the bottom portion 2030 is stepped down from the conveying surface 2018. As shown in FIG. 22, the thickness of the bottom portion 2030 in the portion of the bottom portion that lies beneath the upper portion may vary to accommodate the varied profile of the top portion 2020. The portion of the bottom portion forming the shelf may have a substantially constant thickness.

The illustrative platform member 2012 further includes connectors, illustrated as spring tabs 2060 extending from a bottom surface of the lower member 2030 opposite the conveying surface 2018. The spring tabs 2060 mate with corresponding receivers in the body members 2014 of the conveyor belt 2000. Pegs 2061 may also be formed on the bottom surface. The pegs 2061 may be received in slots in the body members 2014 of the conveyor belt 2000.

Figure 28A:
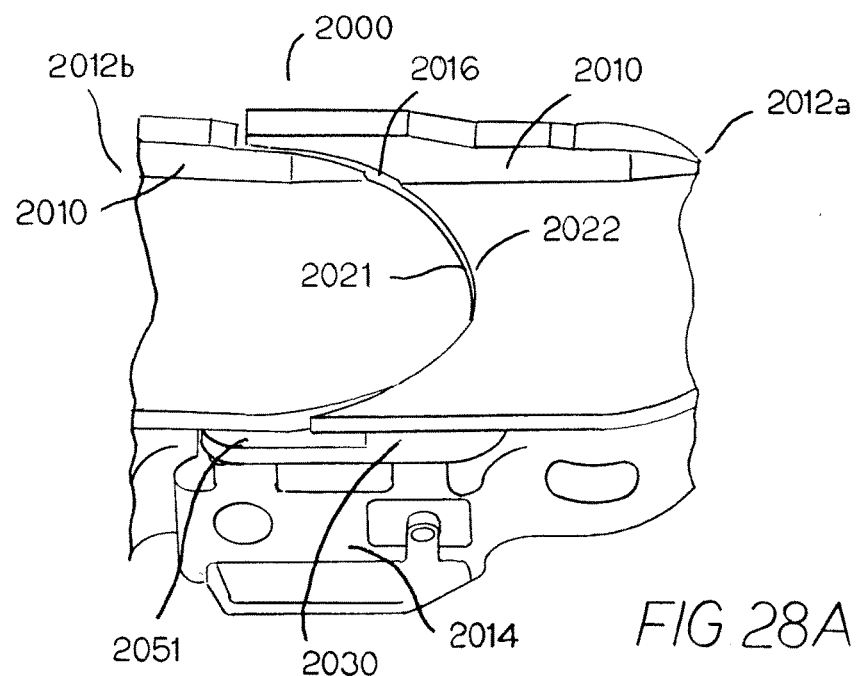
FIGS. 28A and 28B show the interaction between adjacent platform members during rotation of the platform members relative to each other.
Figure 28B:
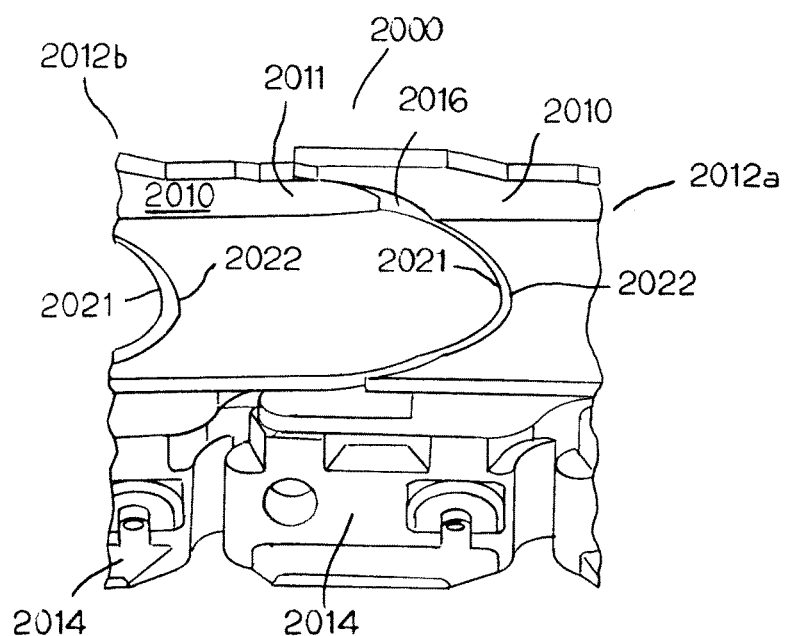

As shown in FIGS. 28A and 28B, the curved leading edge 2021, which protrudes from the lower portion 2030 of the platform member 2012, curved lagging edge 2022, which is stepped up from the lower portion 2030 of the platform member, side wall void 2016, and side wall tapered tip 2011 allow rotation of a lead platform member 2012a relative to a lag platform member 2012b, while minimizing gaps formed between the two members, ensuring a continuous conveying surface.

Figure 29:
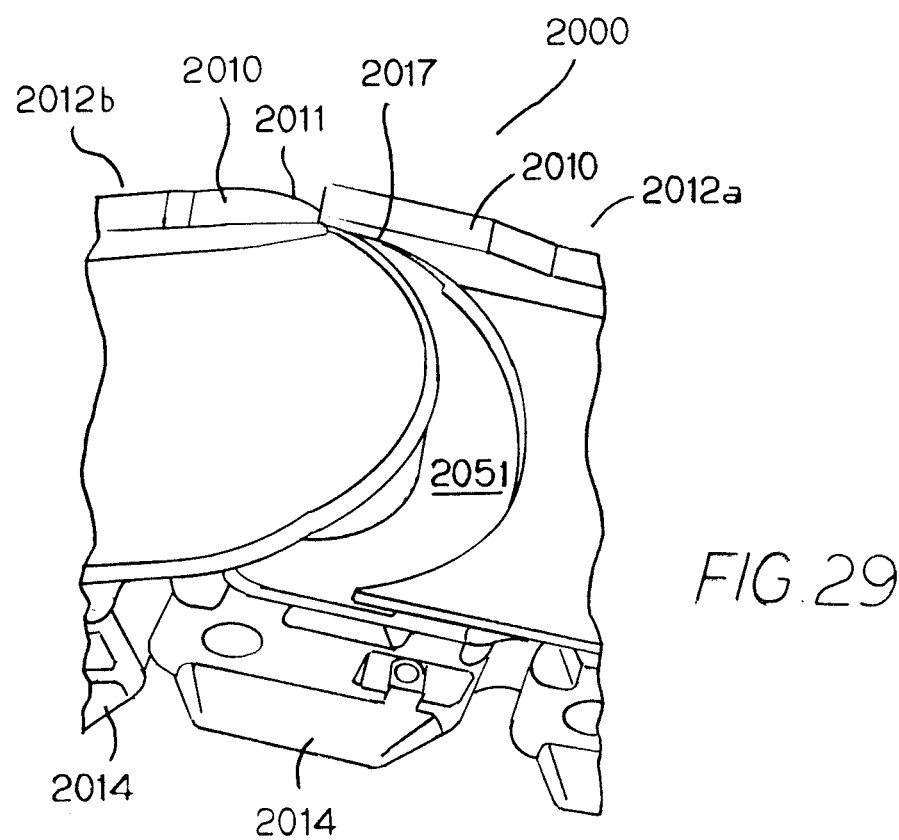
FIG. 29 illustrates a forward bend in the conveyor belt of FIG. 21.
Figure 30:
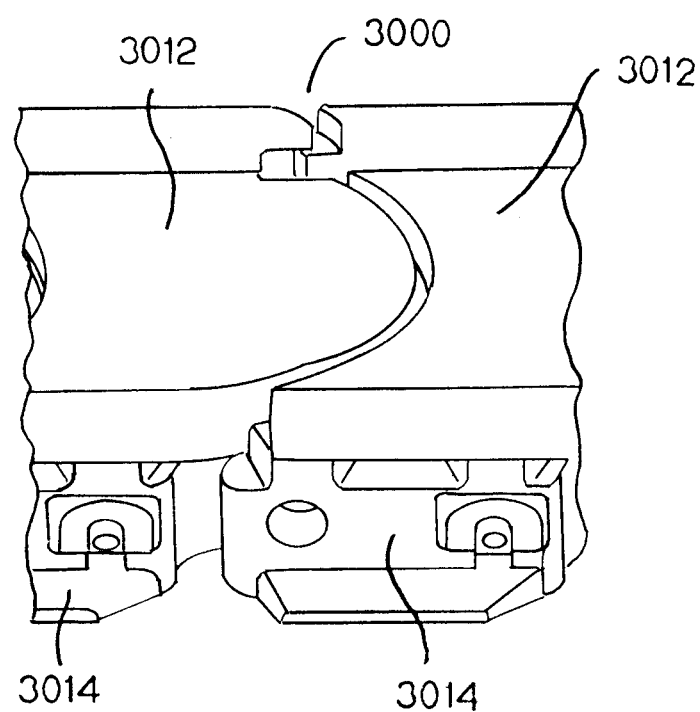
FIG. 30 is an isometric view of a portion of a conveyor belt comprising linked base members and platform members having stepped down shelves and shaped side walls according to another embodiment of the invention.
Figure 31:
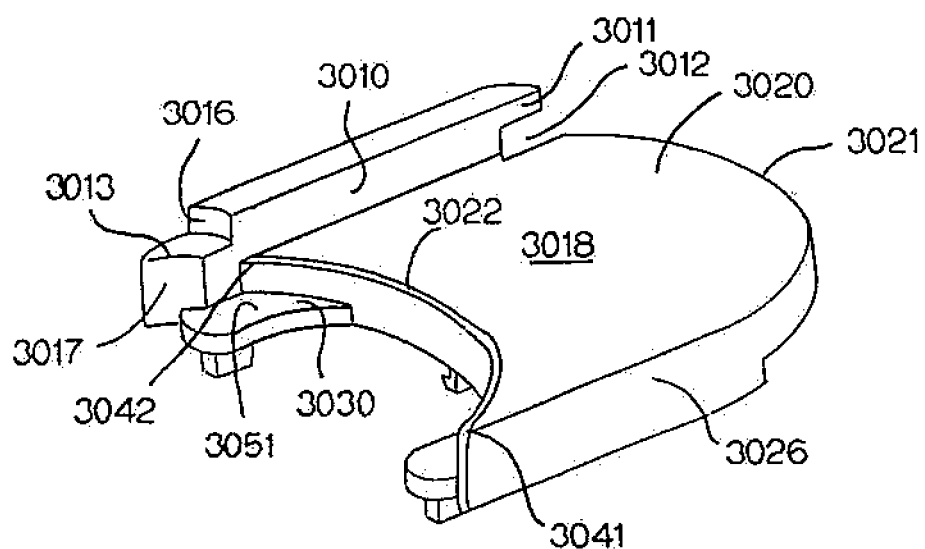
FIG. 31 is an isometric view of a platform member of the embodiment of FIG. 30.
Figure 32:
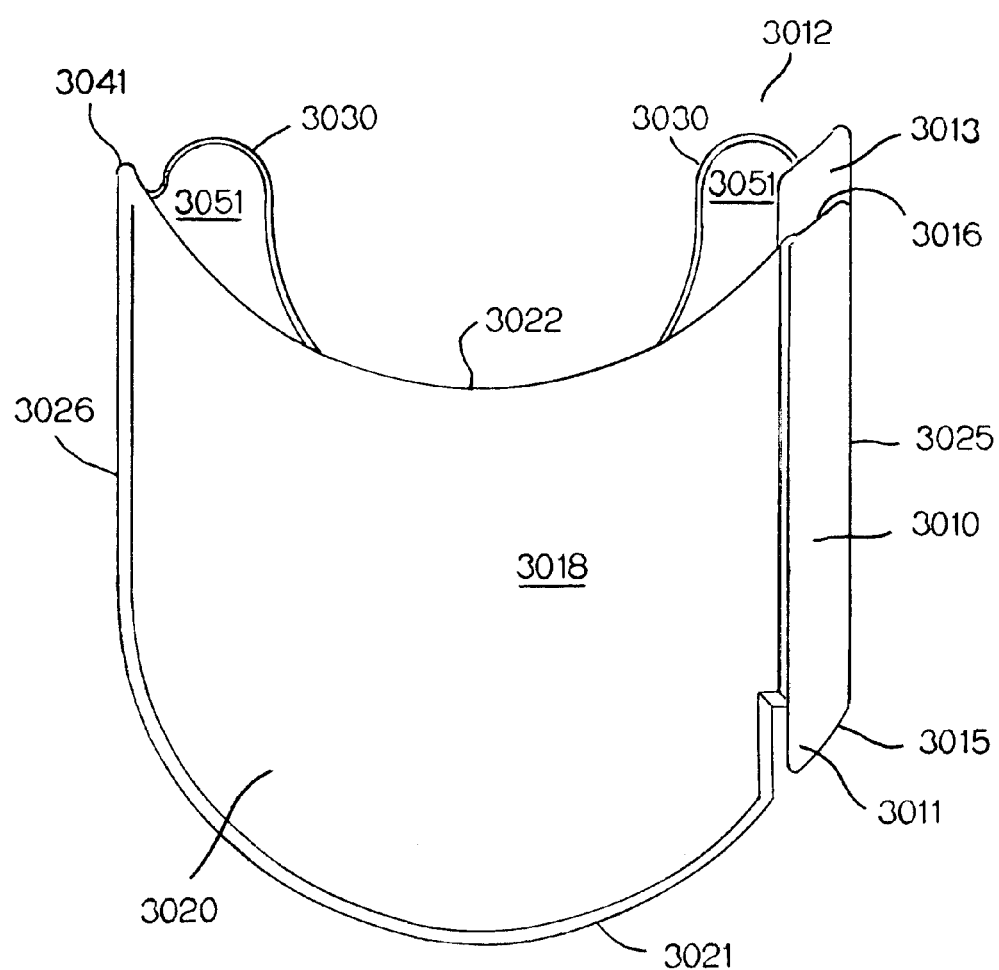
FIG. 32 is a top view of the platform member of FIG. 31.
Figure 33:
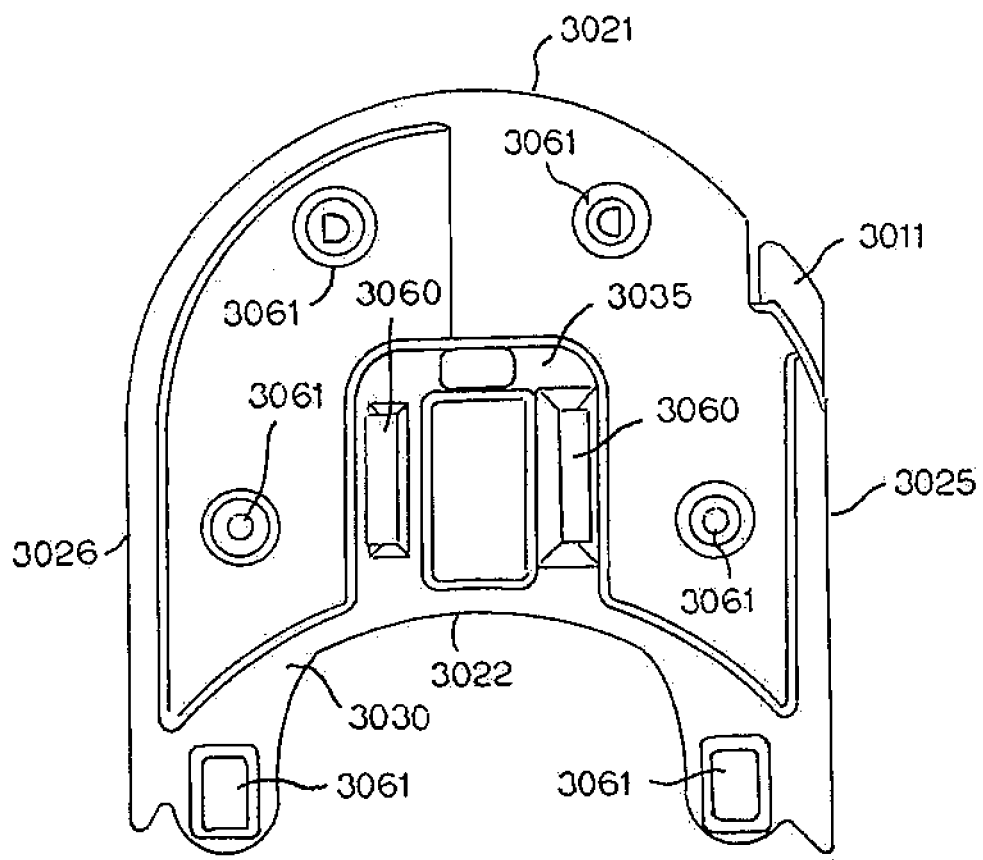
FIG. 33 is a bottom view of the platform member of FIG. 31.
Figure 34:
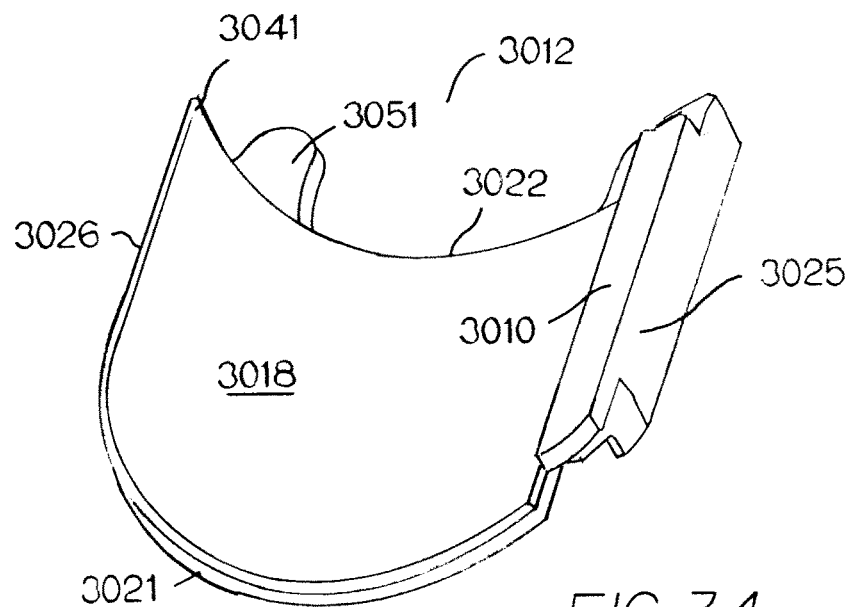
FIG. 34 is an isometric view of the top of the platform member of FIG. 31.
Figure 35:
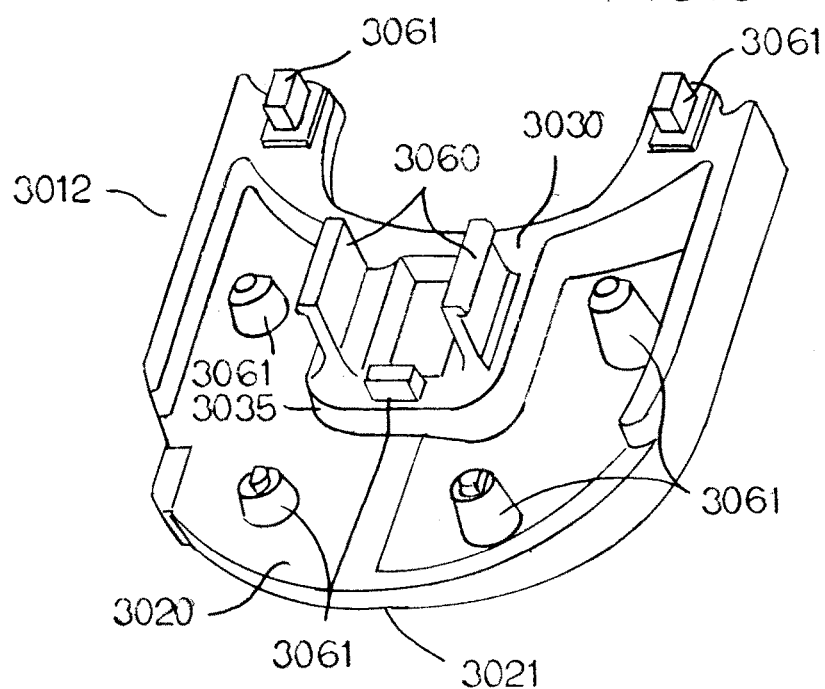
FIG. 35 is an isometric view of the bottom of the platform member of FIG. 31.
Figure 36:
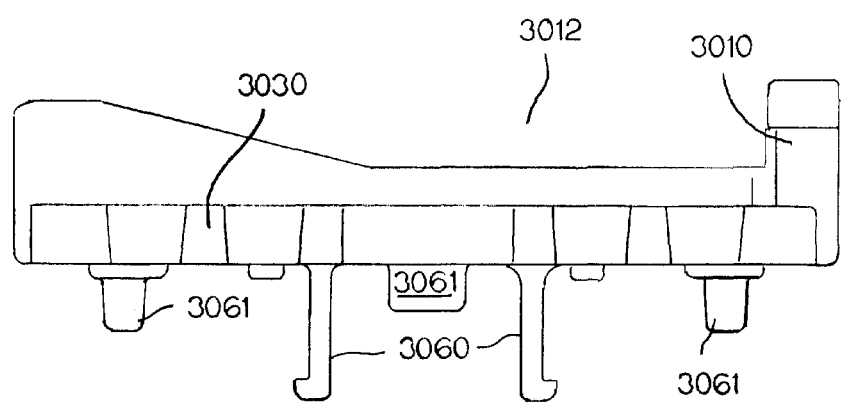
FIG. 36 is a front plan view of the platform member of FIG. 31.
Figure 37:
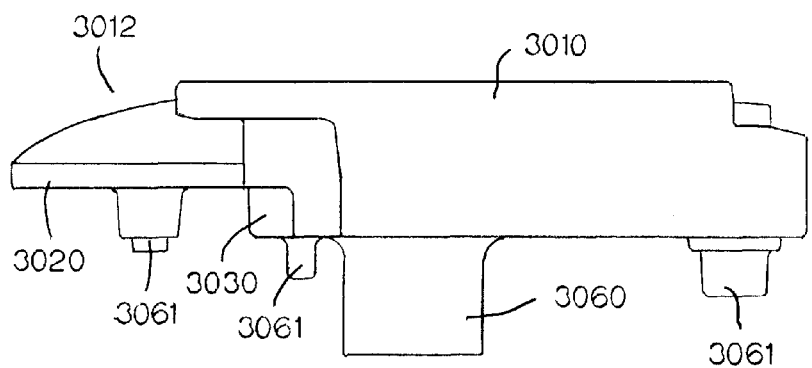
FIG. 37 is a side view of the platform member of FIG. 31.

As shown in FIG. 29, the curved top of the side wall tip 2011 and surface 2017, as well as the step 2051 facilitate forward bending of adjacent platform members 2012 relative to each other while minimizing gaps formed between the two platform members.

FIGS. 30-41 show another embodiment of a conveyor belt 3000 having overlapping platform members 3012 connected to hinged body members 3014.

Each platform member 3012 comprises an upper portion 3020 and a lower portion 3030 stepped down from the upper portion and forming a shelf for receiving the front of a lagging platform member. The upper portion 3020 overlies and protrudes forward from the front of the lower portion 3030.

The upper portion 3020 has a curved lead edge 3021 and a complementary curved lag edge 3022 and extends in width from a first side edge 3025 to a second side edge. The upper portion forms a conveying surface 3018. A side rail 3010 is formed along and above the first side edge 3025. The platform member 3012 may include a stabilizer for pushing a conveyed product towards the side rail 3010.

The upper portion may be non-planar, and may slope down towards the side rail 3010. For example, in the illustrative embodiment, the upper portion forms a flat, horizontal conveying surface 3018a adjacent the side rail, a sloped intermediate surface 3018i sloping up and away from the surface 3018a and another flat horizontal surface 3018o at the second side edge. The top of second side edge is higher than the flat horizontal conveying surface portion adjacent the side rail.

The illustrative curved leading edge 3021 spans the width of upper portion. The illustrative lead edge merges with side edges 3025, 3026. The curved lag edge 3022 is complementary to the lead edge so that the lead edge 3021 of a lag platform fits into the void formed by the lag edge 3022 of a lead platform. The side edges form tapered tails 3041, 3042 at the intersection with the lag edge 3022. The curved lead and lag edges allow rotation of adjacent platform members relative to each other without creating large gaps between adjacent platform members, thereby forming a continuous conveying surface through turns.

The side rail 3010 helps retain conveyed products on the platform member and is designed to facilitate pivoting of adjacent platform members relative to each other. Each side rail 3010 is configured to mate with an adjacent side rail in the series of platform members forming a conveyor belt. The illustrative side rail extends along the side edge 3025 and includes an overhanging front portion 3011 configured to be received by a shelf formed by a stepped protrusion 3013 formed at the rear of the side rail 3010. A space 3012 between the front overhang 3011 and side edge 3025 receives the step 3013 of a leading platform member. The tip of the front portion 3011 preferably tapers in width at curved outer surface 3015, following the curve of the lead edge 3021. A curved inner surface 3016 at the interface between the step 3013 and main body of the side rail 3010 continues the curve of lag edge 3022 and is configured to interface with the curved outer surface 3015 of an adjacent side rail tip 3011. The end of the step 3013 has another curved surface 3017 that facilitates rotation of two mating side rails relative to each other.

As shown in FIGS. 33, 35, 36 and 37 the bottom portion 3030, which may be integrally formed with the upper portion 3020, includes a base 3035 from which connectors 3060 extend. The connectors are illustrated as spring tabs, though the invention is not limited to the illustrative connecting means. The spring tabs 3060 mate with corresponding receivers in the body members 3014 of the conveyor belt 3000. Pegs 3061 may also be formed on the bottom surface. The pegs 3061 may be received in slots in the body members 3014 of the conveyor belt 3000.

The bottom portion 3030 forms a shelf 3051 for receiving the front of a lagging upper portion, allowing overlap between adjacent platform members 3012 in a conveying belt. The shelf surface 2051 formed by the bottom portion 3030 is stepped down from the conveying surface 3018. The shelf 3051 is in the form of bifurcated legs with rounded tips, though the invention is not limited to the illustrative shelf.

Figure 38:
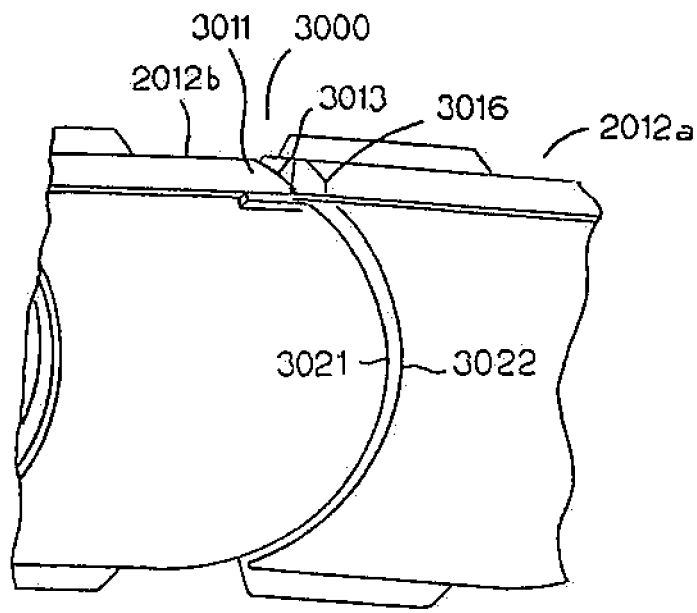
FIG. 38 is a top view of the portion of the conveyor belt of FIG. 30.
Figure 39:
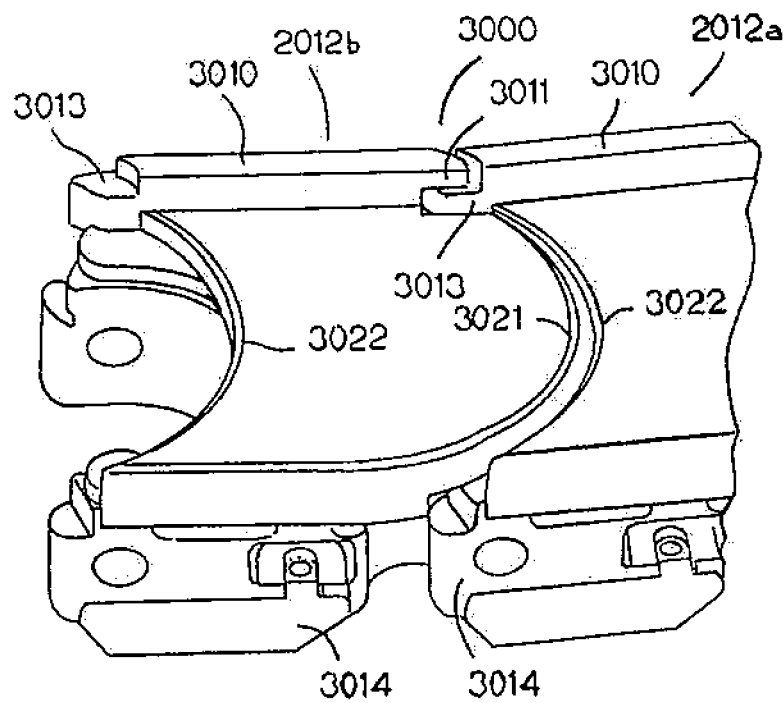
FIG. 39 is an isometric view of the portion of the conveyor belt of FIG. 30, showing rotation of adjacent platform members relative to each other.
Figure 40:
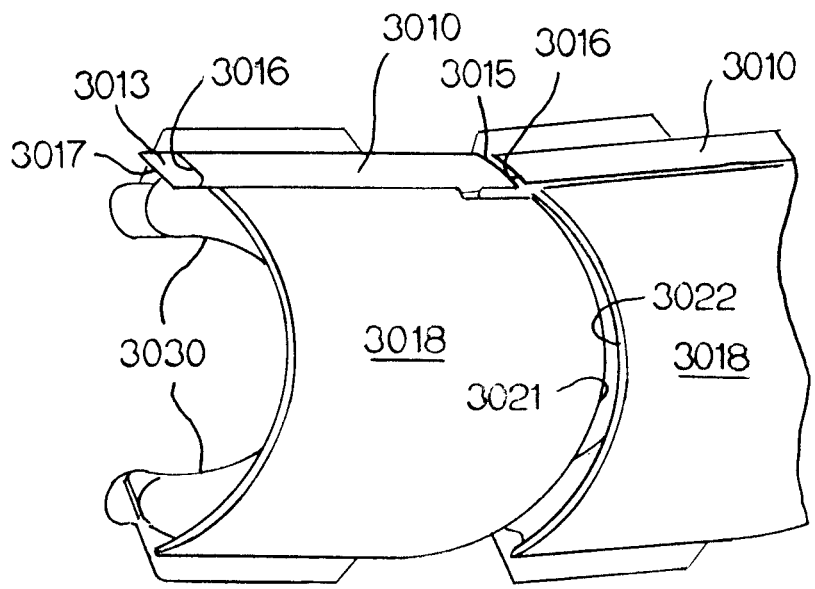
FIG. 40 is a top view of the embodiment of FIG. 39.

As shown in FIGS. 38, 39 and 40, the curved leading edge 3021, which protrudes from the lower portion 3030 of the platform member 3012, curved lagging edge 3022, which is stepped up from the lower portion of the platform member, and shaped side wall configuration allow rotation of a lead platform member 2012a relative to a lag platform member 2012b, while minimizing gaps formed between the two members, ensuring a continuous conveying surface. As shown, in FIG. 38, when the lead platform 2012a rotates relative to the lag platform 2012b, the shaped side walls 3010 accommodate the relative movement while preventing unwanted openings. As shown, the tip 3011 separates from the sidewall 3016, but the overlapping shelf 3013 prevents an opening between the platforms.

Figure 41:
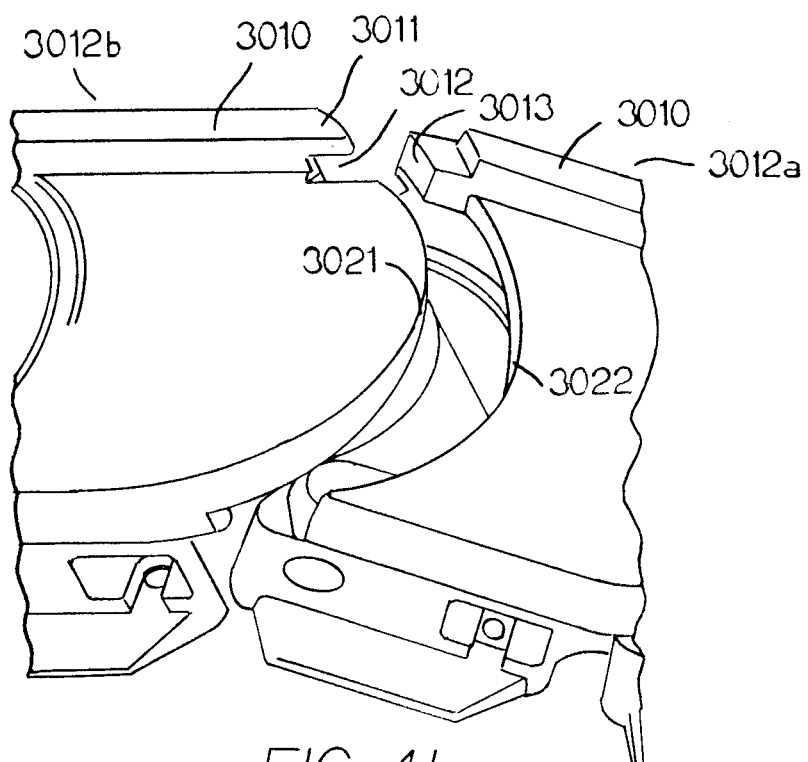
FIG. 41 illustrates a forward bend in the conveyor belt of FIG. 30.

As shown in FIG. 41, the side wall overhangs 3011 and steps 3013 and other features of the platform members allow forward bending of platform members relative to each other while minimizing gaps formed between the two members.

Figure 42A:
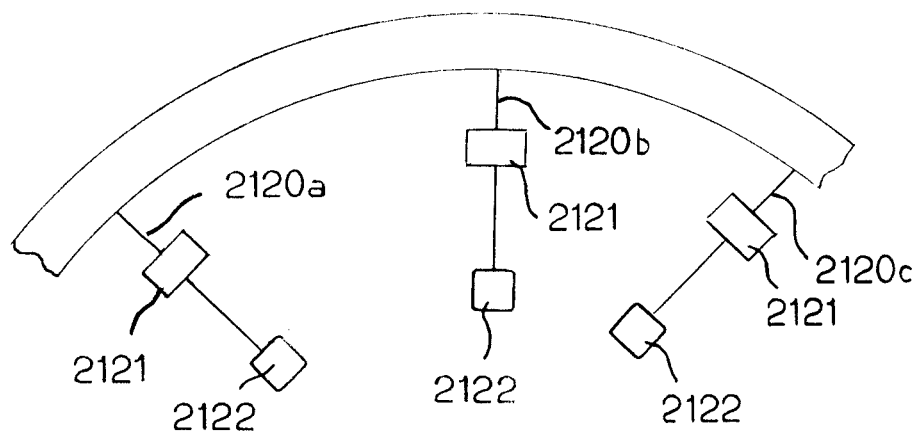
FIGS. 42A and 42B are a top view and side view of a curved portion of a conveyor system including an adjustable banking mechanism.
Figure 42B:
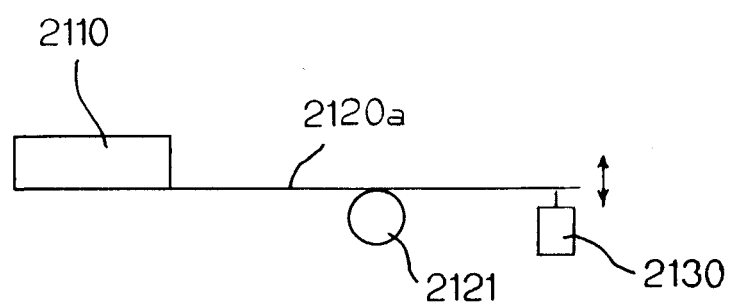

Referring to FIGS. 42A and 42B, another embodiment of the invention provides a conveyor system 2100 with adjustable speed banking around curves to reduce vibrations. The carryway in the curved section 2100 may be semi-flexible. Pivoting supports 2120a, 2120b, 2120c support the curved carryway section 2110. Each pivoting support includes a central pivot 2121 and an end weight or attachment 2122. An actuator 2130 may selectively raise or lower different portions of the curved carryway section 2110. For example, the portion of the carryway connected to the middle pivoting support 2120*b* may have a relatively high banking, while the end portions connected to the outer pivoting supports 2120*a* and 2120*c* may have a lower banking to facilitate a transition to the straight portions of the conveyor system.

Although the invention has been described with reference to specific versions, other versions are possible. The scope of the invention is not meant to be limited to the exemplary versions described in detail.

What is claimed is:

1. A platform member for a conveyor belt for transporting objects, comprising:
   an upper conveying surface for receiving a product, the upper conveying surface extending in length between a lead edge, a lag edge, and in width between a first side edge and a second side edge;
   a bottom surface configured to connect to a body member;
   a rail formed along the first side edge, wherein the rail includes an overhanging portion for receiving a protruding portion of a rail of an adjacent platform member; and
   a stabilizer for pushing a product against the rail.

2. The platform member of claim 1, wherein the stabilizer comprises bristles.

3. The platform member of claim 1, wherein the stabilizer comprises a plurality of raised ribs formed in a trough on the upper conveying surface.

4. The platform member of claim 3, wherein the raised ribs are stepped.

5. The platform member of claim 1, wherein the stabilizer comprises a plurality of flexible members formed in the upper conveying surface.

6. The platform member of claim 5, wherein the flexible members are formed in a channel adjacent the rail.

7. The platform members of claim 6, wherein the flexible members alternate with stiff members formed in the upper conveying surface.

8. The platform member of claim 1, wherein the stabilizer comprises a tiltable wing pivotally connected to the upper conveying surface.

9. The platform member of claim 1, wherein the stabilizer comprises a movable wall connected to the rail.

10. The platform member of claim 9, further comprising a spring extending between the rail and the movable wall.

11. The platform member of claim 1, wherein the stabilizer comprises a row of flexible members extending horizontally into a channel formed in the upper conveying surface.

12. The platform member of claim 11, wherein the upper conveying surface includes a sloped portion adjacent the channel, wherein sloped portion is perpendicular to an inner surface of the rail.

13. The platform member of claim 1, wherein the stabilizer comprises high friction rollers extending from the upper conveying surface.

14. The platform member of claim 13, wherein the upper conveying surface includes a sloped portion from which the high friction rollers extend.

15. The platform member of claim 14, wherein the rail has an inner surface that is perpendicular to the sloped portion of the upper conveying surface.

16. The platform member of claim 1, further comprising nubs disposed on a bottom surface of a flange.

17. The platform member of claim 1, further comprising rollers disposed in a surface of the platform member.

18. The platform member of claim 1, wherein the lead edge comprises a curve extending from the first side edge to the second side edge.

19. The platform member of claim 18, wherein the lag edge comprises a curve complementary to the curve of the lead edge.

20. The platform member of claim 1, wherein the platform member further comprises a stepped portion that is stepped down from the upper conveying surface for receiving a front portion of an adjacent platform member.

21. A platform member for a conveyor belt for transporting objects, comprising:
    a top portion defining an upper conveying surface for receiving a product, the top portion having a curved leading edge, curved lag edge, a first side edge, a second side edge and a side rail extending along the first side edge; and
    a bottom portion stepped down and extending rearwards from the top portion to form a shelf behind the curved lag edge for receiving the front of a lagging top portion, allowing overlap between adjacent platform members in a conveying belt, the bottom portion having connectors for connecting the platform member to an associated body member of the conveyor belt.

22. The platform member of claim 21, further comprising a stabilizer on the top portion for pushing a conveyed product towards the side rail.

23. The platform member of claim 21, wherein the side rail includes an overhanging portion for receiving a protrusion of a side rail of an adjacent platform member.

24. The platform member of claim 23, wherein the side rail has a tapered front tip.

25. The platform member of claim 23, wherein the side rail has a stepped top surface.

26. The platform member of claim 21, wherein the bottom portion includes bifurcated legs extending from the curved lag edge, wherein the bifurcated legs are stepped down from the conveying surface.

27. The platform member of claim 21, wherein the curve of the curved leading edge and the curve of the curved lagging edge span the width of the platform.

28. The platform member of claim 21, wherein the bottom portion has a nose portion at a lead edge below the upper conveying surface and a complementary void at a lag edge that is set back from the curved lag edge of the upper portion.

29. The platform member of claim 21, wherein the curved lead edge spans the width of the top portion and merges with the first side edge and the second side edge, a curved lag edge spans the width of the top portion and merges with the first side edge and second side edge to form tapered tails at the intersections between the curved lag edge and side edges.

30. A platform member for a conveyor belt for transporting objects, comprising:
    an upper conveying surface for receiving a product, the upper conveying surface extending in length between a lead edge, a lag edge, and in width between a first side edge and a second side edge;
    a bottom surface configured to connect to a body member;
    a rail formed along the first side edge; and
    a row of flexible members extending horizontally into a channel formed in the upper conveying surface for pushing a product against the rail.

31. A platform member for a conveyor belt for transporting objects, comprising:
  an upper conveying surface for receiving a product, the upper conveying surface extending in length between a lead edge, a lag edge, and in width between a first side edge and a second side edge;
  a bottom surface configured to connect to a body member;
  a rail formed along the first side edge; and
  high friction rollers extending from the upper conveying surface for pushing product against the rail.

32. A platform member for a conveyor belt for transporting objects, comprising:
  an upper conveying surface for receiving a product, the upper conveying surface extending in length between a lead edge, a lag edge, and in width between a first side edge and a second side edge;
  a bottom surface configured to connect to a body member;
  a rail formed along the first side edge; and
  a plurality of flexible members in the upper conveying surface adjacent the rail, wherein the flexible members alternate with stiff members formed in the upper conveying surface.

33. A platform member for a conveyor belt for transporting objects, comprising:
  a top portion defining an upper conveying surface for receiving a product, the top portion having a curved leading edge, curved lag edge, a first side edge, a second side edge and a side rail having a stepped top surface extending along the first side edge; and
  a bottom portion stepped down and extending rearwards from the top portion, the bottom portion having connectors for connecting the platform member to an associated body member of the conveyor belt.

* * * * *